United States Patent [19]

Van Gestel et al.

[11] Patent Number: 5,751,889
[45] Date of Patent: May 12, 1998

[54] RECORDING AND REPRODUCTION OF A TRICK MODE VIDEO SIGNAL

[75] Inventors: Wilhelmus J. Van Gestel; Ronald W.J.J. Saeijs, both of Eindhoven, Netherlands

[73] Assignee: U.S. Philips Corporation, New York, N.Y.

[21] Appl. No.: 839,427

[22] Filed: Apr. 14, 1997

Related U.S. Application Data

[63] Continuation of Ser. No. 402,263, Mar. 10, 1995, abandoned.

[30] Foreign Application Priority Data

Apr. 12, 1994 [EP] European Pat. Off. ............ 94200943

[51] Int. Cl.$^6$ ..................... H04N 5/91; G11B 5/09
[52] U.S. Cl. ..................... 386/68; 386/74; 360/48
[58] Field of Search ..................... 360/10.1, 10.3, 360/32, 33.1, 48, 53; 358/335, 6, 68, 74, 81, 124

[56] References Cited

U.S. PATENT DOCUMENTS

| | | | |
|---|---|---|---|
| 5,109,271 | 4/1992 | Borgers et al. | 358/13 |
| 5,142,421 | 8/1992 | Kahlman et al. | 360/40 |
| 5,245,483 | 9/1993 | Van Gestel | 360/40 |
| 5,377,051 | 12/1994 | Lane et al. | 360/33.1 |
| 5,400,187 | 3/1995 | Van Gestel | 360/48 |
| 5,430,579 | 7/1995 | Onishi et al. | 360/32 |
| 5,434,677 | 7/1995 | Oikawa | 360/10.1 |

FOREIGN PATENT DOCUMENTS

| | | | |
|---|---|---|---|
| 0606856 A2 | 7/1994 | European Pat. Off. | H04N 9/80 |
| 0606856 A3 | 1/1995 | European Pat. Off. | H04N 9/80 |

OTHER PUBLICATIONS

U.S. Patent Serial No. 08/276,004, filed Jul. 15, 1994 (PHN 14,515) corresponding to Belgian patent No. 93.00.746.
U.S. Patent Serial No. 08/127,223, filed Sep. 27, 1993 (PHN 14,241) corresponding to EPA 93.292.950.
U.S. Patent Serial No. 08/204,904, filed Mar. 2, 1994 (PHN 13,668) corresp. to EPA 509,594.

Primary Examiner—Aristotelis M. Psitos
Assistant Examiner—Regina Y. Neal
Attorney, Agent, or Firm—Edward W. Goodman

[57] ABSTRACT

A recording arrangement for recording trick mode information in portions of tracks includes at least two recording heads (A, B). Trick mode information recorded in the portions in the tracks enable a trick mode during reproduction in a reproducing arrangement having reading heads (50) for reading the trick mode information from the tracks, the reading heads including at least a first and a second reading head (A,B) located at the circumference of a head drum, and where the transport speed of the record carrier (40) in the said trick mode being n times the nominal transport velocity during normal play reproduction where n is an integer and comprises a divisor number p larger than 1. The trick mode information is recorded in such a way that in a group of 2p tracks ($T_2$ to $T_7$) the trick mode information is recorded in a portion of a first ($T_2$), second ($T_3$) and a third track ($T_5$) in said group of 2p tracks, the first and second tracks ($T_2,T_3$) being neighboring tracks, the trick mode information stored in the portion ($P_1$) of the first track ($T_2$) being different from the trick mode information stored in the portion ($P_2$) of the second track ($T_3$), the trick mode information stored in the portion ($P_3$) of the third track ($T_5$) being equal to at least part of the trick mode information which is stored in the portion ($P_2$) of one of the first and second tracks ($T_3$).

17 Claims, 19 Drawing Sheets

RECORDING AND REPRODUCTION OF A TRICK MODE VIDEO SIGNAL

This is a continuation of application Ser. No. 08/402,263, filed Mar. 10, 1995 now abandoned.

BACKGROUND OF THE INVENTION

1. Field of the Invention

The invention relates to a recording arrangement for recording a digital video signal in slant tracks on a magnetic record carrier, the recording arrangement comprising an input terminal for receiving the digital video signal, channel encoding means for channel encoding the digital video signal so as to obtain a channel signal suitable for recording in a track on said record carrier, and writing means for writing the channel signal in the tracks, the writing means comprising at least a first and a second writing head having head gaps of different azimuth angles and located at the circumference of a rotatable head drum. The invention further relates to a record carrier obtained with the recording arrangement, and to a reproducing arrangement for reproducing the video signal from the record carrier.

2. Description of The Related Art

A recording arrangement as given in the opening paragraph is known from European Patent Application EP-A 492,704, corresponding to U.S. Pat. No. 5,245,483, Reference (1) in the LIST OF REFERENCES that can be found at the end of this application.

The known arrangement is a recording arrangement of the helical scan type and records an information signal comprising a digital audio signal and a digital video signal in audio signal recording sectors and video signal recording sectors, respectively, in subsequent tracks. Reference is made in this respect to the earlier filed European Patent Applications No. 93.202.950, corresponding to U.S. patent application Ser. No. 08/127,223, filed Sep. 27, 1993, Reference (2) in the LIST OF REFERENCES, and No. 93.201.263, corresponding to U.S. Pat. No. 5,400,187, Reference (3) in the LIST OF REFERENCES.

The prior art references relate to proposals for the realization of a new digital video cassette (DVC) recorder standard, which enables the recording and reproduction of digital video and digital audio on/from a longitudinal magnetic record carrier. This new digital video recorder standard will lead to new digital video recorders/reproducers of the so-called DVC type.

SUMMARY OF THE INVENTION

The invention aims at providing a recording arrangement which is capable of recording other type of information signals. More specifically, the invention aims at providing such information to be recorded that one or more trick modes during reproduction of the signals from the record carrier are possible. The recording arrangement in accordance with the invention is characterized in that the recording arrangement is further provided with trick mode information generation means for deriving a trick mode video signal from the digital video signal, the channel encoding means being adapted to encode the trick mode video signal and the digital video signal so as to obtain a composite channel signal at its output, the writing means being adapted to write the composite channel signal in the tracks, that, for realizing a trick mode reproduction in a reproducing arrangement having reading means for reading the composite channel signal from the tracks, the reading means having at least a first and a second reading head located on a head drum such that the two heads are either located separately from each other at an angle around the circumference of the head drum or form a head pair of two rigidly connected heads located side by side, the first and second heads of the reading means having gaps with an azimuth angle which is substantially equal to the azimuth angle of the first and second write heads, respectively, of the writing means, the transport speed of the record carrier in said trick mode being n times the nominal transport velocity during normal play reproduction where n is an integer and comprises a divisor number p larger than 1, the channel encoding means are adapted to encode the trick mode video signal in such a way that in a group of 2p tracks, the encoded trick mode video signal is recorded in a portion of a first, second and a third track in said group of 2p tracks, the first and second tracks being neighboring tracks, the encoded trick mode information stored in the portion of the first track being different from the encoded trick mode information stored in the portion of the second track, the encoded trick mode information stored in the portion of the third track being equal to at least part of the encoded trick mode information which is stored in the portion of one of the first and second tracks.

The invention is based on the recognition that such trick mode information should be recorded on the record carrier so that trick modes are possible for reproducing arrangements having different kinds of scanner configurations. More specifically, the trick mode information recorded should enable trick modes to be realized in reproducing arrangements having either at least a pair of separate reading heads located at, e.g., 180° at the circumference of the head drum, or at least one head pair of two rigidly connected heads located side by side at the circumference of the head drum. In accordance with the invention, track portions in at least three tracks of a group of 2p tracks are filled with trick mode information.

During reproduction in a trick mode, in an arrangement having two separate heads at, e.g., 180° at the circumference of the head drum, the first head of a pair of heads reads the trick mode information recorded in the portion in the first track and the second head of the pair reads the trick mode information recorded in the portion in the at least third track, and, if needed, the trick mode information recorded in a portion in another track.

During reproduction in a trick mode, in an arrangement having at least one head pair at the circumference of the head drum, the first head of the head pair reads the trick mode information recorded in the portion in the first track and the second head of the pair reads the trick mode information recorded in the portion in the second track. As in both cases, the information read from the track must be the same, it will be clear that the trick mode information recorded in the portion of the second track must be identical to the trick mode information stored in the portion in the third track and, if present, in the portion of said other track.

When the factor n is an odd number, the portions all can lie on the same position in the tracks. If n is an even number, the portion in the third track will not lie in the same position in the track as the position of the portions in the first and second tracks.

The recording arrangement may be further characterized in that, for realizing a second trick mode reproduction in said reproducing arrangement at a transport speed of the record carrier in the said second trick mode being −n times the nominal transport velocity during normal play reproduction, the trick mode information generation means being further adapted to derive a second trick mode video signal from the digital video signal, the channel encoding means being adapted to encode the second trick mode video signal into an encoded second trick mode video signal in such a way that in said group of 2p tracks the said encoded second trick mode video signal is recorded in a portion of a fourth, fifth and a sixth track in said group of 2p tracks, the fourth and fifth tracks being neighboring tracks, the encoded trick mode information stored in the portion of the fourth track being different from the encoded trick mode information stored in the portion of the fifth track, the encoded trick mode information stored in the portion of the sixth track being equal to at least part of the encoded trick mode information which is stored in the portion of one of the fourth and fifth tracks.

In the same way, for other trick mode velocities, trick mode information can be generated and stored in portions in the tracks.

It should be noted that various prior art references relating to other ways of realizing trick modes during read out from a record carrier are given in the LIST OF REFERENCES, see the References (7), (8) and (9) in the LIST OF REFERENCES.

BRIEF DESCRIPTION OF THE DRAWINGS

These and other aspects of the invention will be apparent from and elucidated with reference to the embodiments described hereafter in the Figure description. In the drawings.

DESCRIPTION OF THE PREFERRED EMBODIMENTS

Figure 1A:
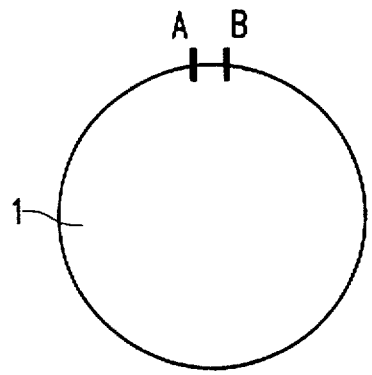
FIG. 1A, FIG. 1B and FIG. 1C each shows a scanner configuration of the recording arrangement or the reproducing arrangement.
Figure 1B:
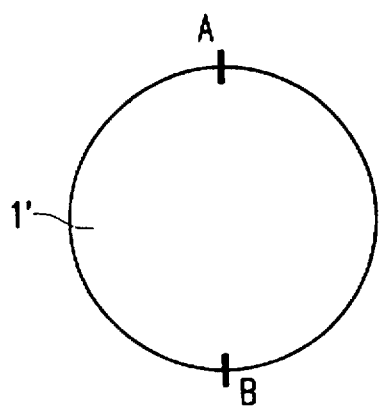
Figure 1C:
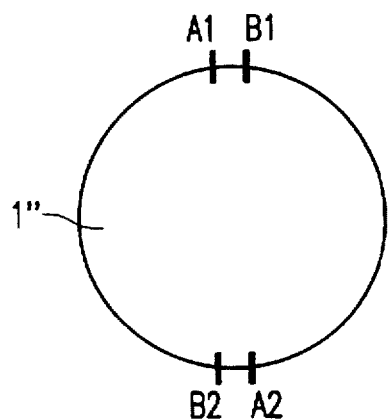

FIGS. 1A to 1C show three scanner configurations for a recording arrangement and for a reproducing arrangement for realizing a 'normal play' reproduction mode and a 'trick play' reproduction mode. FIG. 1A shows a scanner 1, provided with one head pair with heads denoted A and B, located side by side and being rigidly connected, and having gaps with different azimuth angles. FIG. 1B shows a scanner 1', provided with a pair of separate heads, denoted A and B, with gaps having different azimuth angles and are located at the circumference of the head drum at an angle of 180°. FIG. 1C shows a scanner 1", provided with two head pairs, one head pair denoted A1/B1 and the second head pair denoted A2/B2. The heads in each head pair having gaps of different azimuth angles. Both head pairs are located at the circumference of the head drum at an angle of 180°.

It should be noted here that recording arrangements provided with the scanner configurations as per FIGS. 1A or 1B, have the same rotational velocity of the head drum. Recording arrangements provided with the scanner configuration as per FIG. 1C have a rotational velocity for the head drum which is half the rotational velocity given above. In the same way, reproducing arrangements having the scanner configurations as per one of the FIGS. 1A or 1B, have the same rotational velocity as the recording arrangements provided with the same scanner configuration. Reproducing arrangements having the scanner configuration as per FIG. 1C, have half that rotational velocity.

It should be noted that even other scanner configurations are possible, such as, e.g., four separate heads located at 90° at the circumference of the head drum, two heads located at 180° now having the same azimuth angle. Or a scanner configuration with more than two head pairs.

Figure 2A:
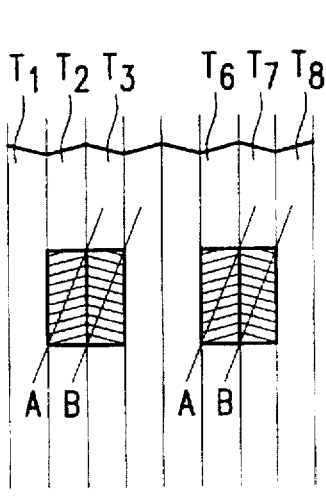
FIGS. 2A to 2E show various track configurations for realizing a $2.v_n$ trick mode.

FIG. 2A shows how the heads A and B of the scanner configuration of FIG. 1A scan the tracks in a trick mode, where the record carrier has a velocity of twice the nominal velocity $v_n$ in, e.g., the forward direction, where $v_n$ is the velocity of the record carrier during reproduction in the normal play mode. FIG. 2A shows a number of tracks $T_1$ to $T_8$, where the odd-numbered tracks have video information recorded in them with one of the heads A and B, that is, with a head having a head gap with a certain azimuth angle, and the even-numbered tracks have video information recorded in them with the head having the gap with the other azimuth angle. It is assumed here that the head A reads the video information in the even-numbered tracks and the head B reads the video information recorded in the odd-numbered tracks.

In the 2 times $v_n$ trick mode, the head pair scans the tracks as shown by the path lines denoted A and B. The head pair A/B reads the information recorded in the hatched portions in the track pairs $T_2/T_3$ and $T_6/T_7$, where the head A reads the information stored in the hatched portions in the tracks $T_2$ and $T_6$, and the head B reads the information stored in the hatched portions in the tracks $T_3$ and $T_7$.

It should be noted here that, if the recording arrangement would have had the scanner configuration as per FIG. 1C, the same track paths would have been present, where the paths crossing the tracks $T_2/T_3$ would have been realized by the head pair A1/B1, and the paths crossing the tracks $T_6/T_7$ would have been realized by the head pair A2/B2.

It should be noted here that FIG. 2A gives the impression that the tracks lie exactly transverse to the length direction of the record carrier. This is not so. The tracks lie slant across the record carrier. Therefore, although the portions lie on the same height in the tracks, there will be a slight shift in the length direction of the track between the portions in the tracks $T_1/T_2$ and the tracks $T_7/T_8$.

Figure 2B:
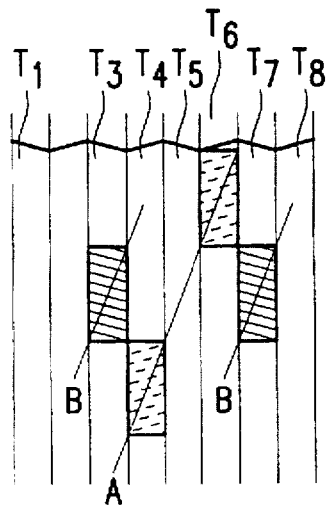

FIG. 2B shows how the heads A and B of the scanner configuration of FIG. 1B scan the tracks in a trick mode, where the record carrier has the velocity of twice the nominal velocity $v_n$. FIG. 2B shows the same number of tracks $T_1$ to $T_8$ of FIG. 2A. It is again assumed that the head A reads the video information in the even numbered tracks and the head B reads the video information recorded in the odd numbered tracks.

In the 2 times $v_n$ trick mode, the heads A and B scan the tracks as shown by the path lines denoted A and B. The head B reads the information recorded in the hatched portions in the tracks $T_3$ and $T_7$. The head A scans the record carrier along the line denoted A, which lies exactly between the lines denoted B in FIG. 2B. The head A cannot read information from the track $T_5$, as the head A has the wrong azimuth for reading information from the track $T_5$. The head A is capable of reading information recorded in the tracks $T_4$ and $T_6$, and can read the information stored in the hatched portions in the tracks $T_4$ and $T_6$, which hatched portions do not lie at the same height (or at the same location) as the hatched portions in the tracks $T_3$ and $T_7$.

The following can be said if it is required to read the same information from the record carrier when scanning the record carrier in one revolution of the head drum in the situations of FIGS. 2A and 2B. The hatched portion in the track $T_3$ in FIG. 2A can have the same contents as the hatched portion in the track $T_3$ in FIG. 2B, and the hatched portion in the track $T_7$ in FIG. 2A then has the same contents as the hatched portion in the track $T_7$ of FIG. 2B. As regards the contents of the hatched portion in the track $T_6$ in FIG. 2A and the hatched portions in the tracks $T_4$ and $T_6$ in FIG. 2B, the following can be said. The hatched portion in the track $T_6$ in FIG. 2A can have the same contents as either hatched portion in the track $T_4$ in FIG. 2B (in which case, the hatched portion in the track $T_6$ in FIG. 2B is not needed, or can be used to store other information in it) or the hatched portion in the track $T_6$ in FIG. 2B (in which case, the hatched portion in the track $T_4$ in FIG. 2B is not needed, or can be used to store other information in it). As an alternative, the hatched portions in the tracks $T_4$ and $T_6$ in FIG. 2B can, as an example, be half as long and comprise together the same information as stored in the hatched portion in the track $T_6$ in FIG. 2A.

Figure 2C:
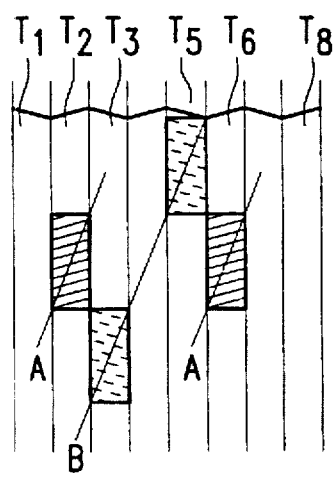

FIG. 2C shows in fact the same situation as FIG. 2B, except for the fact that the hatched portions in the tracks $T_2$ and $T_6$ read by the head A are taken as a kind of reference.

The head B now scans the record carrier along the line denoted B, which lies exactly between the lines denoted A in FIG. 2C. The head B cannot read information from the track $T_4$, as the head B has the wrong azimuth for reading information from the track $T_4$. The head B is capable of reading information recorded in the tracks $T_3$ and $T_5$, and can read the information stored in the hatched portions in the tracks $T_3$ and $T_5$, which hatched portions do not lie at the same height (or at the same location) as the hatched portions in the tracks $T_2$ and $T_6$.

The following can be said if it is required to read the same information from the record carrier when scanning the record carrier in one revolution of the head drum in the situations of FIGS. 2A and 2C. The hatched portion in the track $T_2$ in FIG. 2A can have the same contents as the hatched portion in the track $T_2$ in FIG. 2C, and the hatched portion in the track $T_6$ in FIG. 2A then has the same contents as the track portion in the track $T_6$ in FIG. 2C. Now the following can be said about the contents of the track portions in the track $T_3$ in FIG. 2A and the tracks $T_3$ and $T_5$ in FIG. 2C. The hatched portion in the track $T_3$ in FIG. 2A can have the same contents as either the hatched portion in the track $T_3$ (in which case, the hatched portion in the track $T_5$ is not needed, or can be used to store other information in it) or the hatched portion in the track $T_5$ in FIG. 2C (in which case, the hatched portion in the track $T_3$ is not needed, or can be used to store other information in it). As an alternative, the hatched portions in the tracks $T_3$ and $T_5$ in FIG. 2C can, as an example, be half as long and comprise together the same information as stored in the hatched portion in the track $T_3$ in FIG. 2A.

Figure 2D:
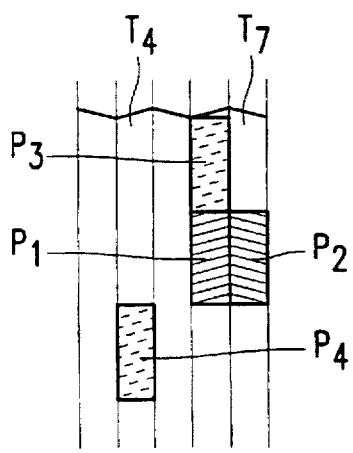

The situations of the FIGS. 2A and 2B can be combined so as to enable a two times $v_n$ trick mode for reproducing arrangements having either the scanner configuration of FIG. 1A, or the scanner configuration of FIG. 1B, or the scanner configuration of FIG. 1C. This results in the track format as shown in FIG. 2D. In a group of 4 tracks, denoted $T_4$ to $T_7$, the hatched portions $P_1$ and $P_2$ in the tracks $T_6$ and $T_7$ are the same as the hatched portions shown in the tracks $T_6$ and $T_7$ in FIG. 2A, and the hatched portions $P_3$ and $P_4$ in the tracks $T_6$ and $T_4$, respectively, correspond to the hatched portions shown in the tracks $T_6$ and $T_4$, respectively, in FIG. 2B.

What has been said earlier, in relation to the hatched portions in the tracks $T_4$ and $T_6$ in FIG. 2B, is thus equally valid for the hatched portions $P_3$ and $P_4$ in FIG. 2D. That is: the hatched portion $P_1$ in the track $T_6$ has the same contents as either the hatched portion $P_3$ in the track $T_6$ (in which case, the hatched portion $P_4$ in the track $T_4$ is not needed, or can be used to store other information in it), or the hatched portion $P_4$ in the track $T_4$ (in which case, the hatched portion $P_3$ in the track $T_6$ is not needed, or can be used to store other information in it). As an alternative, the hatched portions $P_3$ and $P_4$ in the tracks $T_6$ and $T_4$ in FIG. 2D can, as an example, be half as long and comprise together the same information as stored in the hatched portion $P_1$ in the track $T_6$. For neighboring groups of 4 tracks, an identical track format is present at the same locations in those groups as in the group shown in FIG. 2D, for the storage of trick mode information, so as to realize a trick mode reproduction at a tape transport speed of two times $v_n$.

It should further be noted that the portions that are located in one track, such as the portions $P_1$ and $P_3$ in the track $T_6$ in FIG. 2D need not directly adjoin each other, e.g., in the situation where the portions need not be that long as shown in FIG. 2D, for the reason that the amount of 'trick play' information to be stored in the tracks requires less large portions. So, there may be gaps present between those portions, where those gaps could have been used for storing 'normal play' information, that is: the information for realizing a 'normal play' reproduction. Further, the portion $P_4$ in the track $P_4$ may be located at a more lower location in that track.

Figure 2E:
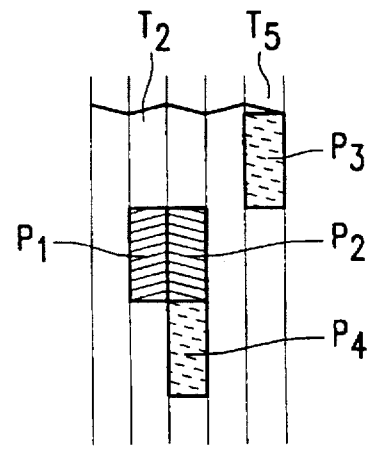

As an alternative of combining the situations of FIGS. 2A and 2B, the situations of the FIGS. 2A and 2C can be combined so as to enable a two times $v_n$ trick mode for reproducing arrangements having either the scanner configuration of FIG. 1A, or the scanner configuration of FIG. 1B, or the scanner configuration of FIG. 1C. This results in the track format as shown in FIG. 2E. In a group of 4 tracks, denoted $T_2$ to $T_5$, the hatched portions $P_1$ and $P_2$ in the tracks $T_2$ and $T_3$ are the same as the hatched portions shown in the tracks $T_2$ and $T_3$ in FIG. 2A, and the hatched portions $P_3$ and $P_4$ in the tracks $T_5$ and $T_3$ correspond to the hatched portions shown in the tracks $T_3$ and $T_5$ in FIG. 2C. What has been said earlier, in relation to the hatched portions in the tracks $T_3$ and $T_5$ in FIG. 2C, is thus equally valid for the hatched portions $P_3$ and $P_4$ in FIG. 2E. That is: the hatched portion $P_2$ in the track $T_3$ has the same contents as either the hatched portion $P_3$ in the track $T_5$ (in which case, the hatched portion $P_4$ in the track $T_3$ is not needed, or can be used to store other information in it), or the hatched portion $P_4$ in the track $T_3$ (in which case, the hatched portion $P_3$ in the track $T_5$ is not needed, or can be used to store other information in it). As an alternative, the hatched portions $P_3$ and $P_4$ in the tracks $T_5$ and $T_3$, respectively, in FIG. 2D can, as an example, be half as long and comprise together the same information as stored in the hatched portion $P_2$ in the track $T_3$. For neighboring groups of 4 tracks, an identical track format is present at the same locations in those groups as in the group shown in FIG. 2E, for the storage of trick mode information, so as to realize a trick mode reproduction at a tape transport speed of two times $v_n$. Further, what has been said above with reference to FIG. 2D for the position of the portions in the tracks, namely, that they need not necessarily be adjoining to each other but can have a gap in between, is in general applicable, and thus also equally applicable here.

Figure 3A:
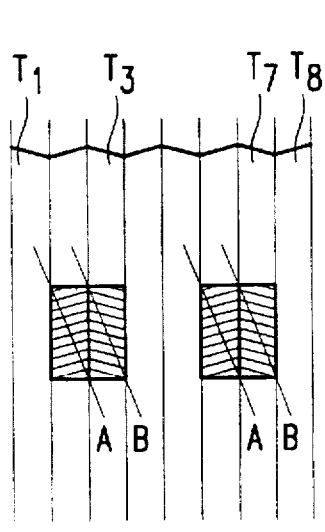
FIGS. 3A to 3E show various track configurations for realizing a $-2.v_n$ trick mode.

FIG. 3A shows how the heads A and B of the scanner configuration of FIG. 1A scan the tracks in a trick mode, where the record carrier has a velocity of twice the nominal velocity $v_n$ in the reverse direction, where $v_n$ is the velocity of the record carrier during reproduction in the normal play mode. FIG. 3A shows in the same way as FIG. 2A the tracks $T_1$ to $T_8$.

In the 2 times $v_n$ trick mode in the reverse direction (otherwise called the $-2$ times $v_n$ trick mode), the head pair scans the tracks as shown by the path lines denoted A and B. The head A reads the information recorded in the hatched portions in the track pairs $T_2/T_3$ and $T_6/T_7$, where the head A reads the information stored in the hatched portions in the tracks $T_2$ and $T_6$ and the head B reads the information stored in the hatched portions in the tracks $T_3$ and $T_7$.

It should again be noted here that, if the recording arrangement would have had the scanner configuration as per FIG. 1C, the same track paths would have been present, where the paths crossing the tracks $T_2/T_3$ would have been realized by the head pair A1/B1 and the paths crossing the tracks $T_6/T_7$ would have been realized by the head pair A2/B2.

Figure 3B:
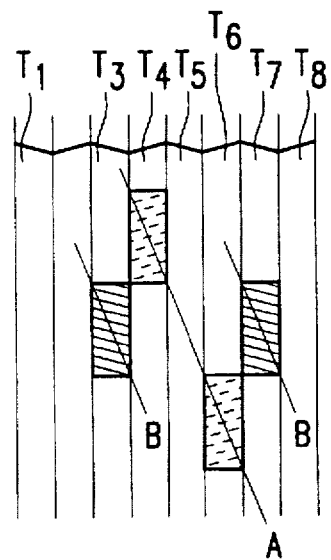

FIG. 3B shows how the heads A and B of the scanner configuration of FIG. 1B scan the tracks in a trick mode, where the record carrier has the velocity of minus twice the nominal velocity $v_n$. FIG. 3B shows the same number of tracks $T_1$ to $T_8$ of FIG. 3A.

In the $-2$ times $v_n$ trick mode, the heads A and B scan the tracks as shown by the path lines denoted A and B. The head B reads the information recorded in the hatched portions in the tracks $T_3$ and $T_7$. The head A scans the record carrier along the line denoted A, which lies exactly between the lines denoted B in FIG. 3B. The head A cannot read information from the track $T_5$, as the head A has the wrong azimuth for reading information from the track $T_5$. The head A is capable of reading information recorded in the tracks $T_4$ and $T_6$, and can read the information stored in the hatched portions in the tracks $T_4$ and $T_6$, which hatched portions do not lie at the same height (or at the same location) as the hatched portions in the tracks $T_3$ and $T_7$.

The following can be said if it is required to read the same information from the record carrier when scanning the record carrier in one revolution of the head drum in the situations of FIGS. 3A and 3B. The hatched portion in the track $T_3$ in FIG. 3A can have the same contents as the hatched portion in the track $T_3$ in FIG. 3B, and the hatched portion in the track $T_7$ in FIG. 3A then has the same contents as the hatched portion in the track $T_7$ in FIG. 3B. Now, the following can be said as regards the hatched portions in the track $T_6$ of FIG. 3A and the tracks $T_4$ and $T_6$ in FIG. 3B. The hatched portion in the track $T_6$ in FIG. 3A can have the same contents as either the hatched portion in the track $T_4$ in FIG. 3B (in which case, the hatched portion in the track $T_6$ in FIG. 3B is not needed, or can be used to store other information in it), or the hatched portion in the track $T_6$ in FIG. 3B (in which case, the hatched portion in the track $T_4$ is not needed, or can be used to store other information in it). As an alternative, the hatched portions in the tracks $T_4$ and $T_6$ in FIG. 3B can, as an example, be half as long and comprise together the same information as stored in the hatched portion in the track $T_6$ in FIG. 3A.

Figure 3C:
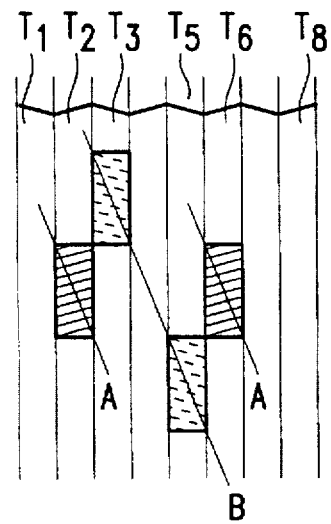

FIG. 3C shows, in fact, the same situation as FIG. 3B, except for the fact that the hatched portions in the tracks $T_2$ and $T_6$ read by the head A are taken as a kind of reference. The head B now scans the record carrier along the line denoted B, which lies exactly between the lines denoted A in FIG. 3C. The head B cannot read information from the track $T_4$, as the head B has the wrong azimuth for reading information from the track $T_4$. The head B is capable of reading information recorded in the tracks $T_3$ and $T_5$, and can read the information stored in the hatched portions in the tracks $T_3$ and $T_5$, which hatched portions do not lie at the same height (or at the same location) as the hatched portions in the tracks $T_2$ and $T_6$.

The following can be said if it is required to read the same information from the record carrier when scanning the record carrier in one revolution of the head drum in the situations of FIGS. 3A and 3C. The hatched portion in the track $T_2$ in FIG. 3A can have the same contents as the hatched portion in the track $T_2$ in FIG. 3C, and the hatched portion in the track $T_6$ in FIG. 3A then has the same contents as the hatched portion in the track $T_6$ in FIG. 3C. The following can be said as regards the hatched portions in the track $T_3$ in FIG. 3A and in the tracks $T_3$ and $T_5$ in FIG. 3C. The hatched portion in the track $T_3$ in FIG. 3A can have the same contents as either the hatched portion in the track $T_3$ in FIG. 3C (in which case, the hatched portion in the track $T_5$ in FIG. 3C is not needed, or can be used to store other information in it) or the hatched portion in the track $T_5$ in FIG. 3C (in which case, the hatched portion in the track $T_3$ is not needed, or can be used to store other information in it). As an alternative, the hatched portions in the tracks $T_3$ and $T_5$ in FIG. 3C can, as an example, be half as long and together comprise the same information as stored in the hatched portion in the track $T_3$ in FIG. 3A.

Figure 3D:
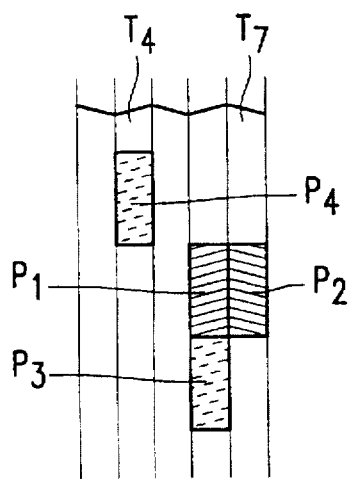

The situations of the FIGS. 3A and 3B can be combined so as to enable a minus two times $v_n$ trick mode for reproducing arrangements having either the scanner configuration of FIG. 1A, or the scanner configuration of FIG. 1B, or the scanner configuration of FIG. 1C. This results in the track format as shown in FIG. 3D. In a group of 4 tracks, denoted $T_4$ to $T_7$, the hatched portions $P_1$ and $P_2$ in the tracks $T_6$ and $T_7$ are the same as the hatched portions shown in the tracks $T_6$ and $T_7$ in FIG. 3A, and the hatched portions $P_3$ and $P_4$ in the tracks $T_6$ and $T_4$, respectively, correspond to the hatched portions shown in the tracks $T_6$ and $T_4$ in FIG. 3B. What has been said earlier, in relation to the hatched portions in the tracks $T_4$ and $T_6$ in FIG. 3B, is thus equally valid for the hatched portions $P_3$ and $P_4$ in FIG. 3D.

For neighboring groups of 4 tracks, an identical track format is present at the same locations in those groups as in the group shown in FIG. 3D, for the storage of trick mode information, so as to realize a trick mode reproduction at a tape transport speed of minus two times $v_n$.

One general remark should be made here as regards a $+n.v_n$ trick mode and a $-n.v_n$ trick mode, more specifically, as regards the patterns shown in FIG. 3D just described for the $-2.v_n$ trick mode, and FIG. 2E for the $+2.v_n$ trick mode. When comparing the FIGS. 2E and 3D, it looks as if both patterns are mirror symmetrical. For explanatory reasons and for simplicity reasons, they are. In reality, however, they are not, as the tracks run slant over the record carrier and the paths that a head runs across the record carrier in the $+n.v_n$ trick mode and the $-n.v_n$ trick mode are not mirror symmetrical around a line exactly transverse to the record carrier. As a result, the position of the portions $P_3$ in the track $T_5$ in FIG. 2E and $P_4$ in the track $T_4$ in FIG. 3D will not be the same. In the same way, the position of the portions $P_4$ in the track $T_3$ in FIG. 2D and $P_3$ in the track $T_6$ in FIG. 3D will not be the same, see also the description to FIGS. 4A to 4C. For the same reasons as given above, the two portions $P_{1-}$ and $P_{2-}$ will also be slightly shifted relative to each other in the length direction of the tracks.

Figure 3E:
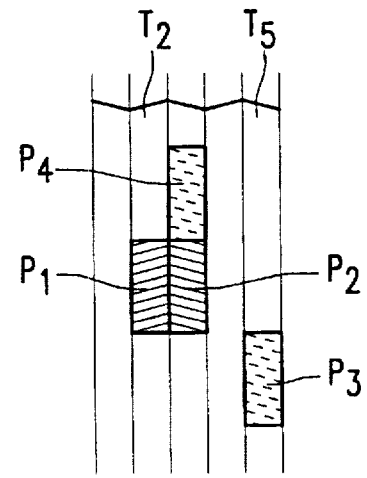

As an alternative to combining the FIGS. 3A and 3B, the situations of the FIGS. 3A and 3C can be combined so as to enable a minus two times $v_n$ trick mode for reproducing arrangements having either the scanner configuration of FIG. 1A, or the scanner configuration of FIG. 1B, or the scanner configuration of FIG. 1C. This results in the track format as shown in FIG. 3E. In a group of 4 tracks, denoted $T_2$ to $T_5$, the hatched portions $P_1$ and $P_2$ in the tracks $T_2$ and $T_3$ are the same as the hatched portions shown in the tracks $T_2$ and $T_3$ in FIG. 3A, and the hatched portions $P_3$ and $P_4$ in the tracks $T_5$ and $T_3$ correspond to the hatched portions shown in the tracks $T_5$ and $T_3$ in FIG. 3C. What has been said earlier, in relation to the hatched portions in the tracks $T_3$ and $T_5$ in FIG. 3C, is thus equally valid for the hatched portions $P_3$ and $P_4$ in FIG. 3E. For neighboring groups of 4 tracks, an identical track format is present at the same locations in those groups as in the group shown in FIG. 3E, for the storage of trick mode information, so as to realize a trick mode reproduction at a tape transport speed of minus two times $v_n$.

Figure 4A:
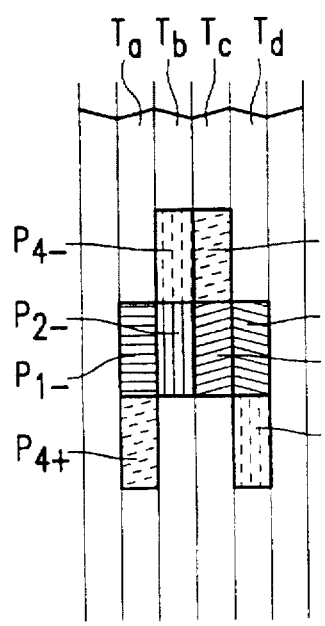
FIGS. 4A to 4C show various track configurations for realizing a $2.v_n$ trick mode and a $-2.v_n$ trick mode.

FIG. 4A shows a combination of the formats of FIGS. 2D and 3E, so as to realize both trick modes, that is: the 2 times $v_n$ trick mode and the $-2$ times $v_n$ trick mode. FIG. 4A shows again a group of 4 tracks $T_a$ to $T_d$. The portions denoted $P_{1+}$ to $P_{4+}$ correspond to the portions $P_1$ to $P_4$, respectively, shown in FIG. 2D and the portions denoted $P_{1-}$ to $P_{4-}$ correspond to the portions $P_1$ to $P_4$, respectively, shown in FIG. 3E. For neighboring groups of 4 tracks, an identical track format is present at the same locations in those groups as in the group shown in FIG. 4A, for the storage of trick mode information, so as to realize a trick mode reproduction at a tape transport speed of plus and minus two times $v_n$.

Previously, it has been said that the position of the portions in the tracks differ for the $+n.v_n$ trick mode and the $-n.v_n$ trick mode. As a result, the portions $P_1/P_{2-}$ and $P_{1-}/P_{2+}$ need not lie on the same height in a track. Further, assuming the portions $P_{1-}/P_{2-}$ and $P_{1+}/P_{2+}$ lie on substantially the same height in the tracks, the distance between the portions $P_{2-}$ and $P_{4-}$ in the track $T_b$ will be different from the distance between the portions $P_{1+}$ and $P_{3+}$ in the track $T_c$, and the distance between the portions $P_{1-}$ and $P_{4+}$ in the track $T_a$ will be different from the distance between the portions $P_{2+}$ and $P_{3-}$ in the track $T_d$. The same, or an equivalent reasoning, will be valid for all the other combinations of a $+n.v_n$ trick mode pattern and a $-n.v_n$ trick mode pattern.

Figure 4B:
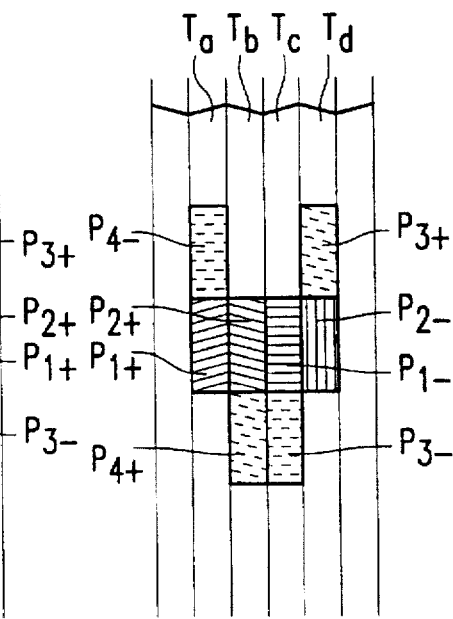

FIG. 4B shows a combination of the formats of FIGS. 2E and 3D, so as to realize both trick modes, that is: the 2 times $v_n$ trick mode and the $-2$ times $v_n$ trick mode. FIG. 4B shows again a group of 4 tracks $T_a$ to $T_d$. The portions denoted $P_{1+}$ to $P_{4+}$ correspond to the portions $P_1$ to $P_4$, respectively, shown in FIG. 2E, and the portions denoted $P_{1-}$ to $P_{4-}$ correspond to the portions $P_1$ to $P_4$, respectively, shown in FIG. 3D. For neighboring groups of 4 tracks, an identical track format is present at the same locations in those groups as in the group shown in FIG. 4B, for the storage of trick mode information, so as to realize a trick mode reproduction at a tape transport speed of plus and minus two times $v_n$.

Figure 4C:
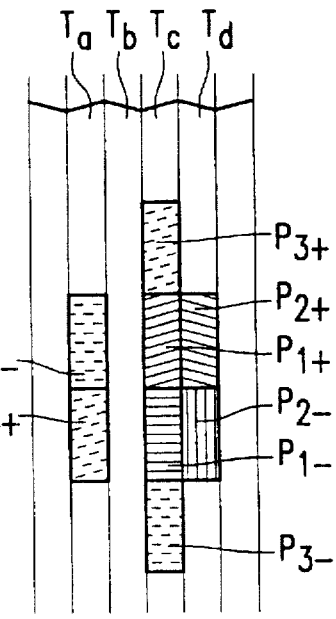

FIG. 4C shows a combination of the formats of FIGS. 2D and 3D, so as to realize both trick modes, that is: the 2 times $v_n$ trick mode and the $-2$ times $v_n$ trick mode. FIG. 4C shows again a group of 4 tracks $T_a$ to $T_d$. The portions denoted $P_{1+}$ to $P_{4+}$ correspond to the portions $P_1$ to $P_4$, respectively, shown in FIG. 2D, and the portions denoted $P_{1-}$ to $P_{4-}$ correspond to the portions $P_1$ to $P_4$, respectively, shown in FIG. 3D. For neighboring groups of 4 tracks, an identical track format is present at the same locations in those groups as in the group shown in FIG. 4B, for the storage of trick mode information, so as to realize a trick mode reproduction at a tape transport speed of plus and minus two times $v_n$. The difference with the formats of FIGS. 4A and 4B is that the trick mode information in the portions $P_{1+}$ and $P_{2+}$, the portions $P_{1-}$ and $P_{2-}$ do not lie at the same height (in the same location) in a track.

It will be clear that a fourth format could have been obtained when combining the formats of FIGS. 2E and 3E.

Figure 5A:
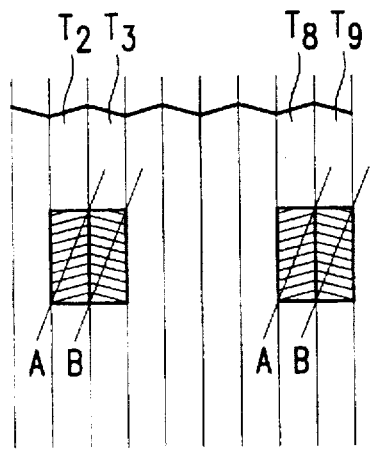
FIGS. 5A to 5E show various track configurations for realizing a $3.v_n$ trick mode.

Further, it should be noted that in each group of four tracks as shown in the FIGS. 4A to 4C, the information contents of the portions $P_{1+}$ and $P_{1-}$, and the information contents of the portions $P_{2-}$ and $P_{2+}$ can be equal to each other FIG. 5A now shows how the heads A and B of the scanner configuration of FIG. 1A scan the tracks in a trick mode, where the record carrier has a velocity of three times the nominal velocity $v_n$ in, e.g., the forward direction.

In the 3 times $v_n$ trick mode, the head pair scans the tracks as shown by the path lines denoted A and B. The head A reads the information recorded in the hatched portions in the track pairs $T_2/T_3$ and $T_8/T_9$, where the head A reads the information stored in the hatched portions in the tracks $T_2$ and $T_8$, and the head B reads the information stored in the hatched portions in the tracks $T_3$ and $T_9$.

It should be noted here that, if the recording arrangement would have had the scanner configuration as per FIG. 1C, the same track paths would have been present, where the paths crossing the tracks $T_2/T_3$ would have been realized by the head pair A1/B1 and the paths crossing the tracks $T_8/T_9$ would have been realized by the head pair A2/B2.

Figure 5B:
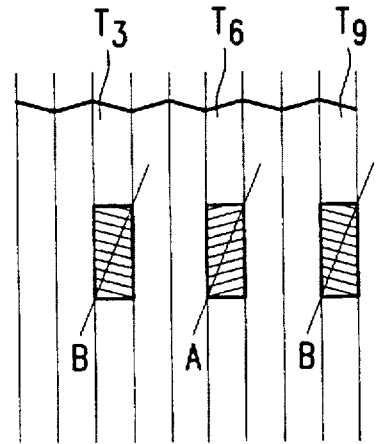

FIG. 5B shows how the heads A and B of the scanner configuration of FIG. 1B scan the tracks in a trick mode, where the record carrier has the velocity of three times the nominal velocity $v_n$. FIG. 5B shows the same number of tracks $T_1$ to $T_9$ of FIG. 5A.

In the 3 times $v_n$ trick mode, the heads A and B scan the tracks as shown by the path lines denoted A and B. The head B reads the information recorded in the hatched portions in the tracks $T_3$ and $T_9$. The head A scans the record carrier along the line denoted A, which lies exactly between the lines denoted B in FIG. 5B. The head A can read information from the hatched portion in the track $T_6$, as the head A has the correct azimuth for reading information from the track $T_6$.

The following can be said if it is required to read the same information from the record carrier when scanning the record carrier in one revolution of the head drum in the situations of FIGS. 5A and 5B. The hatched portion in the track $T_3$ in FIG. 5A can have the same contents as the hatched portion in the track $T_3$ in FIG. 5B, and the hatched portion in the track $T_9$ in FIG. 5A then has the same contents as the hatched portion in the track $T_9$ of FIG. 5B. As regards the contents of the hatched portion in the track $T_8$ in FIG. 5A and the hatched portion in the track $T_6$ in FIG. 5B, it can be said they both have the same contents.

Figure 5C:
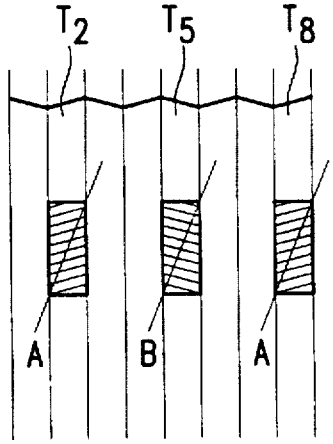

FIG. 5C shows in fact the same situation as FIG. 5B, except for the fact that the hatched portions in the tracks $T_2$ and $T_8$ read by the head A are taken as a kind of reference. The head B now scans the record carrier along the line denoted B, which lies exactly between the lines denoted A in FIG. 5C. The head B can read information from the track $T_5$, as the head B has the correct azimuth for reading information from the track $T_5$.

The following can be said if it is required to read the same information from the record carrier when scanning the record carrier in one revolution of the head drum in the situations of FIGS. 5A and 5C. The hatched portion in the track $T_2$ in FIG. 5A can have the same contents as the hatched portion in the track $T_2$ in FIG. 5C, and the hatched portion in the track $T_8$ in FIG. 5A then has the same contents as the track portion in the track $T_8$ in FIG. 5C. Now the following can be said about the contents of the hatched portion in the track $T_3$ in FIG. 5A and the hatched portion in the track $T_5$ in FIG. 5C. The hatched portion in the track $T_3$ in FIG. 5A has the same contents as the hatched portion in the track $T_5$ in FIG. 5C.

Figure 5D:
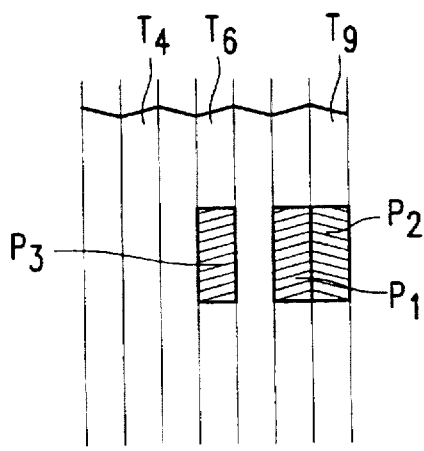

The situations of the FIGS. 5A and 5B can be combined so as to enable a three times $v_n$ trick mode for reproducing arrangements having either the scanner configuration of FIG. 1A, or the scanner configuration of FIG. 1B, or the scanner configuration of FIG. 1C. This results in the track format as shown in FIG. 5D. In a group of 6 tracks, denoted $T_4$ to $T_9$, the hatched portions $P_1$ and $P_2$ in the tracks $T_8$ and $T_9$ are the same as the hatched portions shown in the tracks $T_8$ and $T_9$ in FIG. 5A, and the hatched portion $P_3$ in the track $T_6$ corresponds to the hatched portion shown in the track $T_6$ in FIG. 5B.

What has been said earlier, in relation to the hatched portion in the track $T_6$ in FIG. 5B, is thus equally valid for the hatched portion $P_3$ in FIG. 5D. That is: the hatched portion $P_1$ in the track $T_8$ has the same contents as the hatched portion $P_3$ in the track $T_6$. For neighboring groups of 6 tracks, an identical track format is present at the same locations in those groups as in the group shown in FIG. 5D, for the storage of trick mode information, so as to realize a trick mode reproduction at a tape transport speed of three times $v_n$.

Figure 5E:
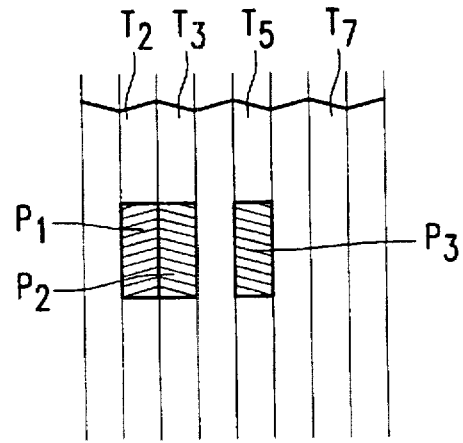

As an alternative, the situations of the FIGS. 5A and 5C can be combined so as to enable a three times $v_n$ trick mode for reproducing arrangements having either the scanner configuration of FIG. 1A, or the scanner configuration of FIG. 1B, or the scanner configuration of FIG. 1C. This results in the track format as shown in FIG. 5E. In a group of 6 tracks, denoted $T_2$ to $T_7$, the hatched portions $P_1$ and $P_2$ in the tracks $T_2$ and $T_3$ are the same as the hatched portions shown in the tracks $T_2$ and $T_3$ in FIG. 5A, and the hatched portion $P_3$ in the track $T_5$ corresponds to the hatched portion shown in the track $T_5$ in FIG. 5C. What has been said earlier, in relation to the hatched portion in the track $T_5$ in FIG. 5C, is thus equally valid for the hatched portion $P_3$ in FIG. 5E. That is: the hatched portion $P_2$ in the track $T_3$ has the same contents as the hatched portion $P_3$ in the track $T_5$. For neighboring groups of 6 tracks, an identical track format is present at the same locations in those groups as in the group shown in FIG. 5E, for the storage of trick mode information, so as to realize a trick mode reproduction at a tape transport speed of three times $v_n$.

The same exercise as has been carried out, with reference to FIG. 3, for the minus 2 times $v_n$ trick mode, can be carried out for the minus 3 times $v_n$ trick mode. The results are shown in FIGS. 6A and 6B.

Figure 6A:
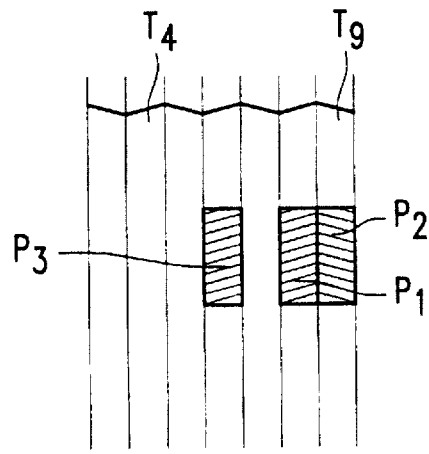
FIGS. 6A and 6B show track configurations for realizing a $-3.v_n$ trick mode.

In order to enable a minus three times $v_n$ trick mode for reproducing arrangements having either the scanner configuration of FIG. 1A, or the scanner configuration of FIG. 1B, or the scanner configuration of FIG. 1C, a track format as shown in FIG. 6A can be used. In a group of 6 tracks, denoted $T_4$ to $T_7$, the hatched portions $P_1$ and $P_2$ in the tracks $T_8$ and $T_9$ are the same as the hatched portions shown in the tracks $T_8$ and $T_9$ in FIG. 5A, and the hatched portion $P_3$ in the track $T_6$ has the same contents as the hatched portion $P_1$ in the track $T_8$. For neighboring groups of 6 tracks, an identical track format is present at the same locations in those groups as in the group shown in FIG. 6A, for the storage of trick mode information, so as to realize a trick mode reproduction at a tape transport speed of minus three times $v_n$.

It will become clear, when comparing the groups of 6 tracks shown in FIGS. 5D and 6A, that both groups are the same.

Figure 6B:
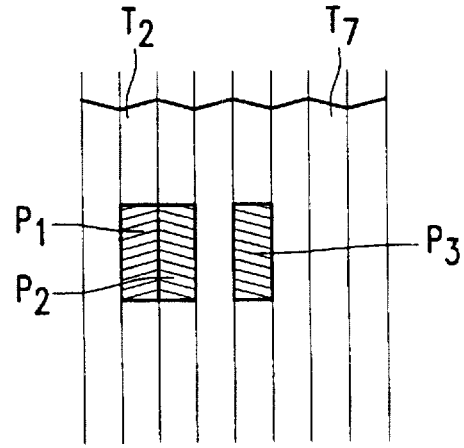

As an alternative, the track format of FIG. 6B can be obtained so as to enable a minus three times $v_n$ trick mode for reproducing arrangements having either the scanner configuration of FIG. 1A, or the scanner configuration of FIG. 1B, or the scanner configuration of FIG. 1C. In a group of 6 tracks, denoted $T_2$ to $T_7$, the hatched portions $P_1$ and $P_2$ in the tracks $T_2$ and $T_3$ are the same as the hatched portions shown in the tracks $T_2$ and $T_3$ in FIG. 5A, and the hatched portion $P_3$ in the track $T_5$ has the same contents as the portion $P_2$ in the track $T_3$. For neighboring groups of 6 tracks, an identical track format is present at the same locations in those groups as in the group shown in FIG. 6B, for the storage of trick mode information, so as to realize a trick mode reproduction at a tape transport speed of minus three times $v_n$. Again, it can be said that, when comparing the groups of 6 tracks shown in FIGS. 5E and 6B, that both groups are the same.

Figure 7A:
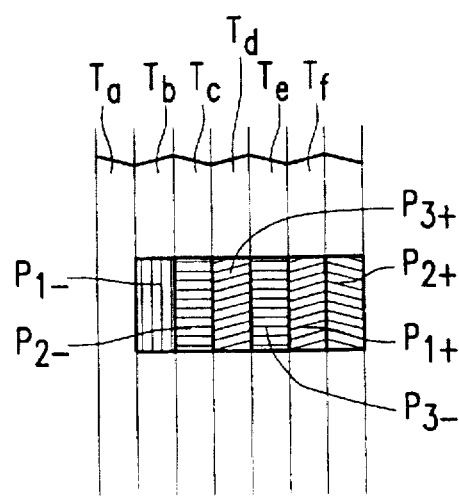
FIGS. 7A and 7B show track configurations for realizing a $3.v_n$ trick mode and a $-3.v_n$ trick mode.

FIG. 7A shows a combination of the formats of FIGS. 5D and 6B, so as to realize both trick modes, that is: the 3 times $v_n$ trick mode and the −3 times $v_n$ trick mode. FIG. 7A shows again a group of 6 tracks $T_a$ to $T_f$. The portions denoted $P_{1+}$ to $P_{3+}$ correspond to the portions $P_1$ to $P_3$, respectively, shown in FIG. 5D and the portions denoted $P_{1-}$ to $P_{3-}$ correspond to the portions $P_1$ to $P_3$, respectively, shown in FIG. 6B. For neighboring groups of 6 tracks, an identical track format is present at the same locations in those groups as in the group shown in FIG. 7A, for the storage of trick mode information, so as to realize a trick mode reproduction at a tape transport speed of plus and minus three times $v_n$.

Figure 7B:
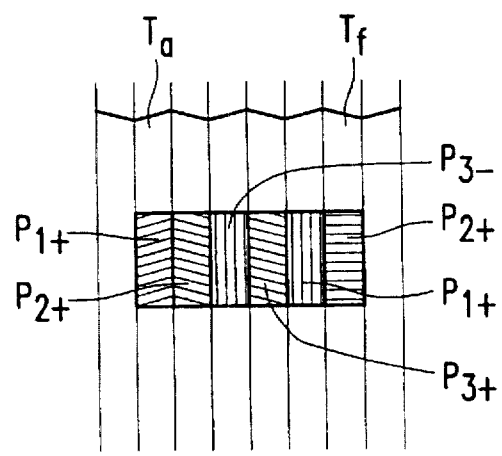

FIG. 7B shows a combination of the formats of FIGS. 5E and 6A, so as to realize both trick modes, that is: the 3 times $v_n$ trick mode and the −3 times $v_n$ trick mode. FIG. 7B shows again a group of 6 tracks $T_a$ to $T_f$. The portions denoted $P_{1+}$ to $P_{3+}$ correspond to the portions $P_1$ to $P_3$, respectively, shown in FIG. 5E and the portions denoted $P_{1-}$ to $P_{3-}$ correspond to the portions $P_1$ to $P_3$, respectively, shown in FIG. 6A. For neighboring groups of 6 tracks, an identical track format is present at the same locations in those groups as in the group shown in FIG. 7B, for the storage of trick mode information, so as to realize a trick mode reproduction at a tape transport speed of plus and minus three times $v_n$.

It will be evident that also the formats of the FIGS. 5A and 6A, or the formats of the FIGS. 5E and 6B would have been combined. In that situation, the portions for the forward trick mode and the reverse trick mode do not lie at the same position in the tracks.

Figure 8A:
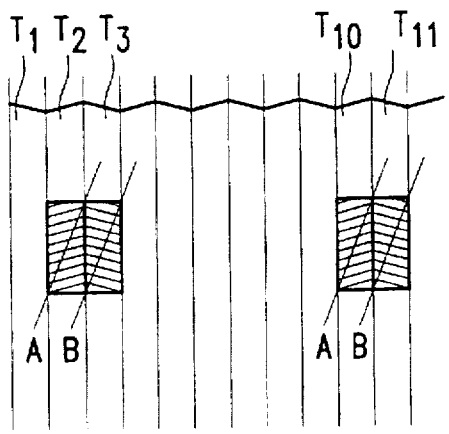
FIGS. 8A to 8E show various track configurations for realizing a $4.v_n$ trick mode.

FIG. 8A shows how the heads A and B of the scanner configuration of FIG. 1A scan the tracks in a trick mode, where the record carrier has a velocity of four times the nominal velocity $v_n$ in, e.g., the forward direction, where $v_n$ is the velocity of the record carrier during reproduction in the normal play mode.

In the 4 times $v_n$ trick mode, the head pair scans the tracks as shown by the path lines denoted A and B. The head A reads the information recorded in the hatched portions in the track pairs $T_2/T_3$ and $T_{10}/T_{11}$, where the head A reads the information stored in the hatched portions in the tracks $T_2$ and $T_{10}$, and the head B reads the information stored in the hatched portions in the tracks $T_3$ and $T_{11}$.

It should be noted here that, if the recording arrangement would have had the scanner configuration as per FIG. 1C, the same track paths would have been present, where the paths crossing the tracks $T_2/T_3$ would have been realized by the head pair A1/B1, and the paths crossing the tracks $T_{10}/T_{11}$ would have been realized by the head pair A2/B2.

Figure 8B:
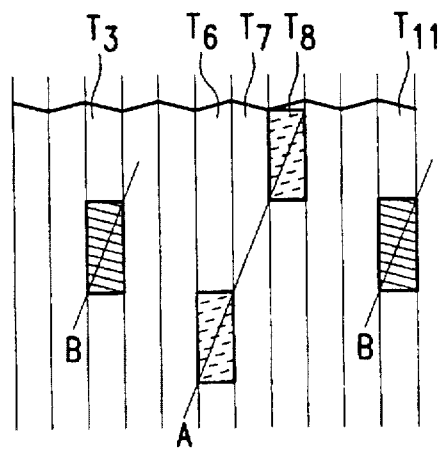

FIG. 8B shows how the heads A and B of the scanner configuration of FIG. 1B scan the tracks in a trick mode, where the record carrier has the velocity of four times the nominal velocity $v_n$. FIG. 8B shows the same tracks as FIG. 8A.

In the 4 times $v_n$ trick mode, the heads A and B scan the tracks as shown by the path lines denoted A and B. The head B reads the information recorded in the hatched portions in the tracks $T_3$ and $T_{11}$. The head A scans the record carrier along the line denoted A, which lies exactly between the lines denoted B in FIG. 8B. The head A cannot read information from the track $T_7$, as the head A has the wrong azimuth for reading information from the track $T_7$. The head A is capable of reading information recorded in the tracks $T_6$ and $T_8$, and can read the information stored in the hatched portions in the tracks $T_6$ and $T_8$, which hatched portions do not lie at the same height (or at the same location) as the hatched portions in the tracks $T_3$ and $T_{11}$.

The following can be said if it is required to read the same information from the record carrier when scanning the record carrier in one revolution of the head drum in the situations of FIGS. 8A and 8B. The hatched portion in the track $T_3$ in FIG. 8A can have the same contents as the hatched portion in the track $T_3$ in FIG. 8B, and the hatched portion in the track $T_{11}$ in FIG. 8A then has the same contents as the hatched portion in the track $T_{11}$ of FIG. 8B. As regards the contents of the hatched portion in the track $T_{10}$ in FIG. 8A and the hatched portions in the tracks $T_6$ and $T_8$ in FIG. 8B, the following can be said. The hatched portion in the track $T_{10}$ in FIG. 8A can have the same contents as either the hatched portion in the track $T_6$ in FIG. 8B (in which case, the hatched portion in the track $T_8$ in FIG. 8B is not needed, or can be used to store other information in it) or the hatched portion in the track $T_8$ in FIG. 8B (in which case, the hatched portion in the track $T_6$ in FIG. 8B is not needed, or can be used to store other information in it). As an alternative, the hatched portions in the tracks $T_6$ and $T_8$ in FIG. 8B can, as an example, be half as long and comprise together the same information as stored in the hatched portion in the track $T_{10}$ in FIG. 8A.

Figure 8C:
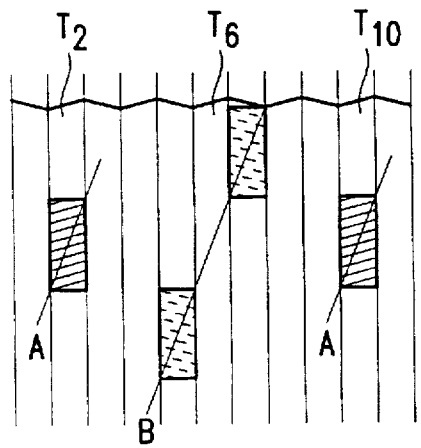

FIG. 8C shows in fact the same situation as FIG. 8B, except for the fact that the hatched portions in the tracks $T_2$ and $T_{10}$ read by the head A are taken as a kind of reference. The head B now scans the record carrier along the line denoted B, which lies exactly between the lines denoted A in FIG. 8C. The head B cannot read information from the track $T_6$, as the head B has the wrong azimuth for reading information from the track $T_6$. The head B is capable of reading information recorded in the tracks $T_5$ and $T_7$, and can read the information stored in the hatched portions in the tracks $T_5$ and $T_7$, which hatched portions do not lie at the same height (or at the same location) as the hatched portions in the tracks $T_2$ and $T_{10}$.

The following can be said if it is required to read the same information from the record carrier when scanning the record carrier in one revolution of the head drum in the situations of FIGS. 8A and 8C. The hatched portion in the track $T_2$ in FIG. 8A can have the same contents as the hatched portion in the track T2 in FIG. 8C, and the hatched portion in the track $T_1$ in FIG. 8A then has the same contents as the track portion in the track $T_{10}$ in FIG. 8C. Now the following can be said about the contents of the track portions in the track $T_3$ in FIG. 8A and the tracks $T_5$ and $T_7$ in FIG. 8C. The hatched portion in the track $T_3$ in FIG. 8A can have the same contents as either the hatched portion in the track $T_5$ (in which case, the hatched portion in the track $T_7$ is not needed, or can be used to store other information in it) or the hatched portion in the track $T_7$ in FIG. 8C (in which case, the hatched portion in the track $T_5$ is not needed, or can be used to store other information in it). As an alternative, the hatched portions in the tracks $T_5$ and $T_7$ in FIG. 8C can, as an example, be half as long and comprise together the same information as stored in the hatched portion in the track $T_3$ in FIG. 8A.

Figure 8D:
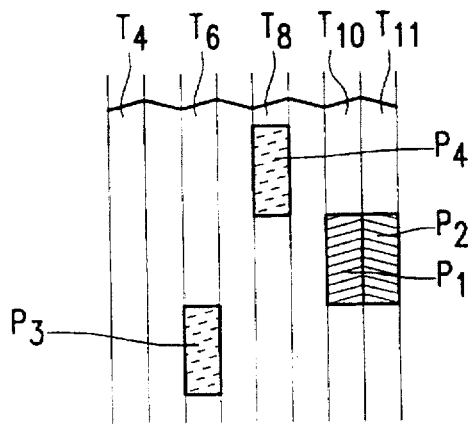

The situations of the FIGS. 8A and 8B can be combined so as to enable a four times $v_n$ trick mode for reproducing arrangements having either the scanner configuration of FIG. 1A, or the scanner configuration of FIG. 1B, or the scanner configuration of FIG. 1C. This results in the track format as shown in FIG. 8D. In a group of 8 tracks, denoted $T_4$ to $T_{11}$, the hatched portions $P_1$ and $P_2$ in the tracks $T_{10}$ and $T_{11}$ are the same as the hatched portions shown in the tracks $T_{10}$ and $T_{11}$ in FIG. 8A, and the hatched portions $P_3$ and $P_4$ in the tracks $T_6$ and $T_8$, respectively, correspond to the hatched portions shown in the tracks $T_6$ and $T_8$, respectively, in FIG. 8B.

What has been said earlier, in relation to the hatched portions in the tracks $T_6$ and $T_8$ in FIG. 8B, is thus equally valid for the hatched portions $P_3$ and $P_4$ in FIG. 8D. That is: the hatched portion $P_1$ in the track $T_{10}$ has the same contents as either the hatched portion $P_3$ in the track $T_6$ (in which case, the hatched portion $P_4$ in the track $T_8$ is not needed, or can be used to store other information in it), or the hatched portion $P_4$ in the track $T_8$ (in which case, the hatched portion $P_3$ in the track $T_6$ is not needed, or can be used to store other information in it). As an alternative, the hatched portions $P_3$ and $P_4$ in the tracks $T_6$ and $T_8$ in FIG. 8D can, as an example, be half as long and together comprise the same information as stored in the hatched portion $P_1$ in the track $T_{10}$. For neighboring groups of 8 tracks, an identical track format is present at the same locations in those groups as in the group shown in FIG. 8D, for the storage of trick mode information, so as to realize a trick mode reproduction at a tape transport speed of four times $v_n$.

Figure 8E:
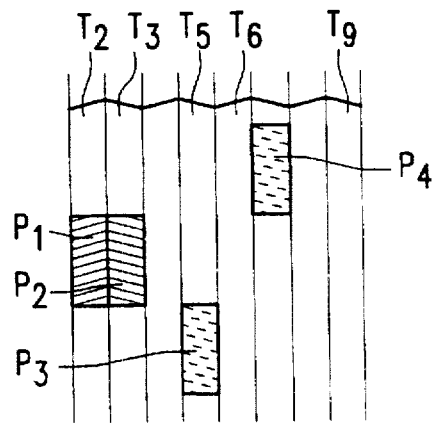

As an alternative, the situations of the FIGS. 8A and 8C can be combined so as to enable a four times $v_n$ trick mode for reproducing arrangements having either the scanner configuration of FIG. 1A, or the scanner configuration of FIG. 1B, or the scanner configuration of FIG. 1C. This results in the track format as shown in FIG. 8E. In a group of 8 tracks, denoted $T_2$ to $T_9$, the hatched portions $P_1$ and $P_2$ in the tracks $T_2$ and $T_3$ are the same as the hatched portions shown in the tracks $T_2$ and $T_3$ in FIG. 8A, and the hatched portions $P_3$ and $P_4$ in the tracks $T_5$ and $T_7$ correspond to the hatched portions shown in the tracks $T_5$ and $T_7$ in FIG. 8C. What has been said earlier, in relation to the hatched portions in the tracks $T_5$ and $T_7$ in FIG. 8C, is thus equally valid for the hatched portions $P_3$ and $P_4$ in FIG. 8E. That is: the hatched portion $P_2$ in the track $T_3$ has the same contents as either the hatched portion $P_3$ in the track $T_5$ (in which case, the hatched portion $P_4$ in the track $T_7$ is not needed, or can be used to store other information in it), or the hatched portion $P_4$ in the track $T_7$ (in which case, the hatched portion $P_3$ in the track $T_5$ is not needed, or can be used to store other information in it). As an alternative, the hatched portions $P_3$ and $P_4$ in the tracks $T_5$ and $T_7$, respectively, in FIG. 8E can, as an example, be half as long and comprise together the same information as stored in the hatched portion $P_2$ in the track $T_3$. For neighboring groups of 8 tracks, an identical track format is present at the same locations in those groups as in the group shown in FIG. 8E, for the storage of trick mode information, so as to realize a trick mode reproduction at a tape transport speed of four times $v_n$.

The same exercise, as has been carried out with reference to FIG. 3, for the minus 2 times $v_n$ trick mode, can be carried out for the minus 4 times $v_n$ trick mode. The results are shown in FIGS. 9A and 9B.

Figure 9A:
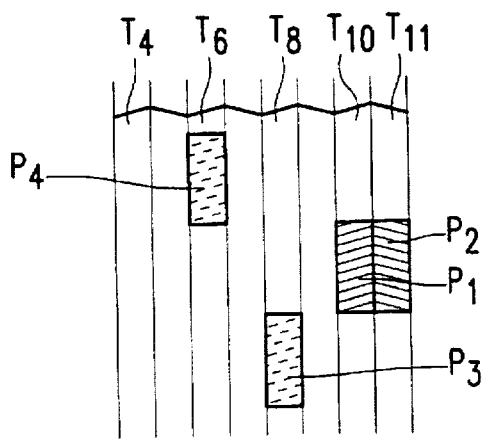
FIGS. 9A and 9B show track configurations for realizing a $-4.v_n$ trick mode.

In order to enable a minus four times $v_n$ trick mode for reproducing arrangements having either the scanner configuration of FIG. 1A, or the scanner configuration of FIG. 1B, or the scanner configuration of FIG. 1C, a track format as shown in FIG. 9A can be used. In a group of 8 tracks, denoted $T_4$ to $T_{11}$, the hatched portions $P_1$ and $P_2$ in the tracks $T_{10}$ and $T_{11}$ are the same as the hatched portions shown in the tracks $T_{10}$ and $T_{11}$ in FIG. 8A. The hatched portion $P_3$ in the track $T_8$ has the same contents as the hatched portion $P_1$ in the track $T_{10}$, in that case, the hatched portion $P_4$ need not be present. The hatched portion $P_4$ in the track $T_6$ has the same contents as the hatched portion $P_1$ in the track $T_{10}$, in that case, the hatched portion $P_3$ need not be present. Or the hatched portions $P_3$ and $P_4$ are both present and the information contained in the portion $P_1$ is included in both portions $P_3$ and $P_4$, which portions may therefore be shorter, viewed in the track direction.

For neighboring groups of 8 tracks, an identical track format is present at the same locations in those groups as in the group shown in FIG. 9A, for the storage of trick mode information, so as to realize a trick mode reproduction at a tape transport speed of minus four times $v_n$.

Figure 9B:
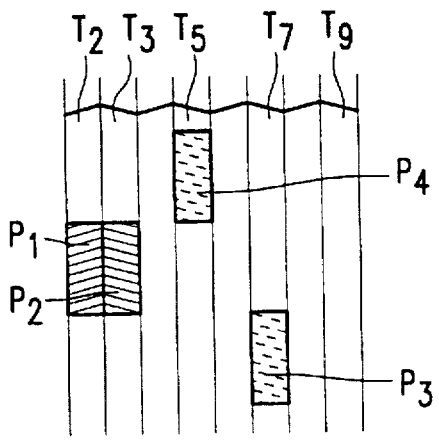

As an alternative, the track format of FIG. 9B can be obtained so as to enable a minus four times $v_n$ trick mode for reproducing arrangements having either the scanner configuration of FIG. 1A, or the scanner configuration of FIG. 1B, or the scanner configuration of FIG. 1C. In a group of 8 tracks, denoted $T_2$ to $T_9$, the hatched portions $P_1$ and $P_2$ in the tracks $T_2$ and $T_3$ are the same as the hatched portions shown in the tracks $T_2$ and $T_3$ in FIG. 8A. The hatched portion $P_3$ in the track $T_7$ has the same contents as the hatched portion $P_2$ in the track $T_3$, in that case the hatched portion $P_4$ need not be present. The hatched portion $P_4$ in the track $T_5$ has the same contents as the hatched portion $P_2$ in the track $T_2$, in that case, the hatched portion $P_3$ need not be present. Or the hatched portions $P_3$ and $P_4$ are both present, and the information contained in the portion $P_2$ is included in both portions $P_3$ and $P_4$, which portions may therefore be shorter, viewed in the track direction.

For neighboring groups of 8 tracks, an identical track format is present at the same locations in those groups as in the group shown in FIG. 9B, for the storage of trick mode information, so as to realize a trick mode reproduction at a tape transport speed of minus four times $v_n$.

Figure 10A:
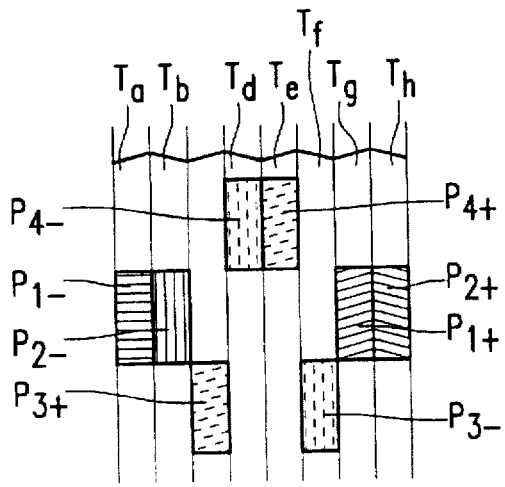
FIGS. 10A to 10C show various track configurations for realizing a $4.v_n$ trick mode and a $-4.v_n$ trick mode.

FIG. 10A shows a combination of the formats of FIGS. 8D and 9B, so as to realize both trick modes, that is: the 4 times $v_n$ trick mode and the $-4$ times $v_n$ trick mode. FIG. 10A shows again a group of 8 tracks $T_a$ to $T_h$. The portions denoted $P_{1+}$ to $P_{4+}$ correspond to the portions $P_1$ to $P_4$, respectively, shown in FIG. 8D, and the portions denoted $P_{1-}$ to $P_{4-}$ correspond to the portions $P_1$ to $P_4$, respectively, shown in FIG. 9B. For neighboring groups of 8 tracks, an identical track format is present at the same locations in those groups as in the group shown in FIG. 10A, for the storage of trick mode information, so as to realize a trick mode reproduction at a tape transport speed of plus and minus four times $v_n$.

Figure 10B:
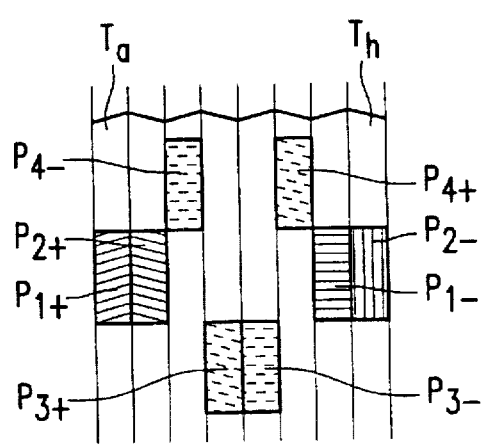

FIG. 10B shows a combination of the formats of FIGS. 8E and 9A, so as to realize both trick modes, that is: the 4 times $v_n$ trick mode and the $-4$ times $v_n$ trick mode. FIG. 10B shows again a group of 8 tracks $T_a$ to $T_h$. The portions denoted $P_{1+}$ to $P_{4+}$ correspond to the portions $P_1$ to $P_4$, respectively, shown in FIG. 8E and the portions denoted $P_{1-}$ to $P_{4-}$ correspond to the portions $P_1$ to $P_4$, respectively, shown in FIG. 9A. For neighboring groups of 8 tracks, an identical track format is present at the same locations in those groups as in the group shown in FIG. 10B, for the storage of trick mode information, so as to realize a trick mode reproduction at a tape transport speed of plus and minus four times $v_n$.

Figure 10C:
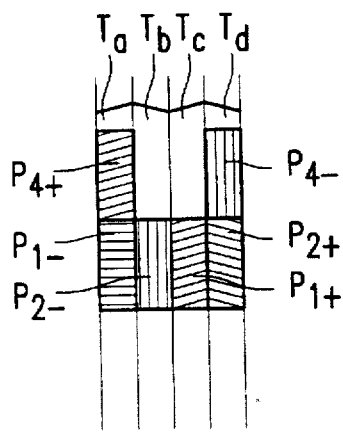

FIG. 10C shows how the group of 8 tracks, shown in FIG. 10A, can be brought back to a group of 4 tracks by 'shifting' the '+' trick mode information over 4 tracks to the left. Further, it is assumed that all information included in the portion $P_{2-}$ is also included in the portion $P_{4-}$, so that the portion $P_{3-}$ has been left out. In the same way, it is assumed that all information included in the portion $P_{1+}$ is also included in the portion $P_{4+}$, so that the portion $P_{3+}$ has been left out. For neighboring groups of 4 tracks, an identical track format is present at the same locations in those groups as in the group shown in FIG. 10C, for the storage of trick mode information, so as to realize a trick mode reproduction at a tape transport speed of plus and minus four times $v_n$. Further, those groups may contain the same information.

As will be apparent, other formats are also possible for realizing the plus and minus four trick mode. More specifically, what has been said in relation to FIG. 4D is equally valid for the track formats of the FIGS. 8B, 8D, 8E, 9A, 9B and 10A to 10C.

Figure 11:
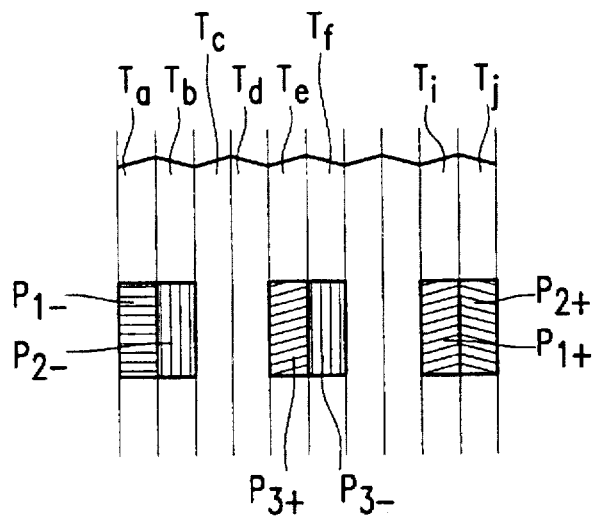
FIG. 11 shows a track configuration for realizing a $5.v_n$ trick mode and a $-5.v_n$ trick mode.

Without giving a further derivation, reference is made to FIG. 11 which shows an example of a group of 10 tracks $T_a$ to $T_j$ for realizing a 5 times $v_n$ trick mode in either the forward or the reverse direction. The contents of the portion $P_{3+}$ is equal to the contents of the portion $P_{1+}$, and the contents of the portion $P_{3-}$ is equal to the contents of the portion $P_{2-}$.

For neighboring groups of 10 tracks, an identical track format is present at the same locations in those groups as in the group shown in FIG. 11, for the storage of trick mode information, so as to realize a trick mode reproduction at a tape transport speed of plus and minus five times $v_n$.

Figure 12A:
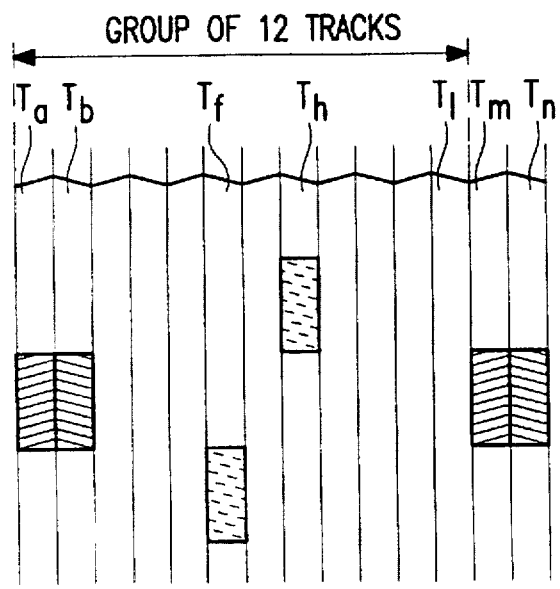
FIGS. 12A to 12C show various track configurations for realizing a $6.v_n$ trick mode.
Figure 12B:
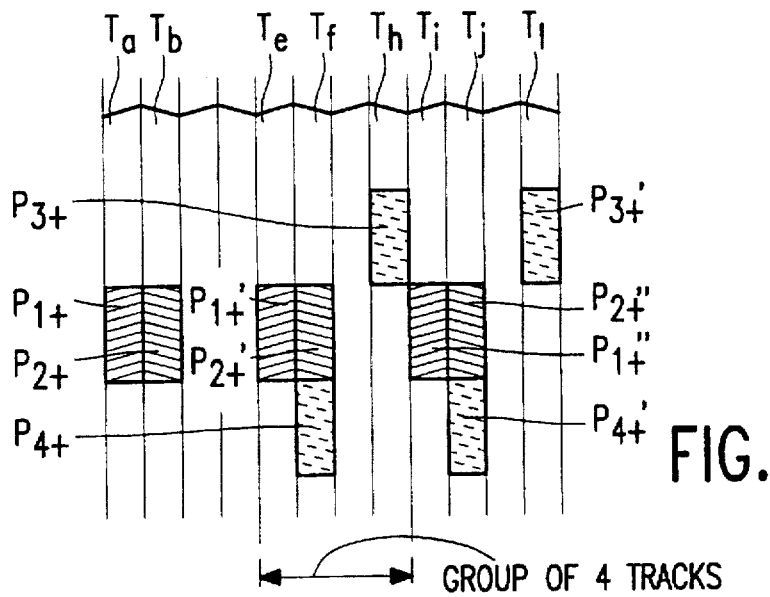

FIG. 12A shows the track format for a 6 times $v_n$ trick mode in the forward direction. A group of 12 tracks can be identified that will be repeated for subsequent groups of 12 tracks. Those groups of 12 tracks comprise different trick mode information, of course. FIG. 12B shows the format of FIG. 12A, in the form of the portions $P_{1+}$ to $P_{4+}$ in the tracks $T_a$, $T_b$, $T_h$ and $T_f$, respectively. FIG. 12B shows, however, the format of FIG. 12A repeated three times inside the group of 12 tracks. As a result, track portions $P_{1+}'$ to $P_{4+}'$ are present in the tracks $T_e$, $T_f$, $T_i$ and $T_j$, respectively, where the information contents of the portions $P_{q+}$ and $P_{q+}'$ are equal, where q runs from 1 to 4. Further are shown the portions $P_{1+}''$ to $P_{4+}''$ in the tracks $T_i$ and $T_j$. The portions $P_{3+}''$ and $P_{4+}''$ are present in the next group of 12 tracks and thus not shown. The information contents of the portions $P_{1+}''$ and $P_1$ are equal, and the information contents of the portions $P_{2+}''$ and $P_2$ are equal. Now groups of 4 tracks can be identified in FIG. 12B, namely, a group of tracks $T_e$ to $T_h$, or a group of tracks $T_i$ to $T_l$. Those groups have the same format and also the same information.

In another embodiment that largely resembles the format of FIG. 12B, three identical groups of 4 tracks are visible, also having the same contents, namely, the group of tracks $T_a$ to $T_d$, $T_e$ to $T_h$, and $T_i$ to $T_l$. The groups of tracks $T_e$ to $T_h$ and $T_i$ to $T_l$ were already the same. Now the portion $T_{3+}''$ is shifted from it position in a track in the next group of 12 tracks, to the same position in the track $T_d$, and the portion $T_{4+}''$ is also shifted from its position in a track in the next group of 12 tracks, to the same position in the track $T_b$, so that the group of tracks $T_a$ of $T_d$ has become identical to the other two groups of 4 tracks. It will be evident that during reproduction using the portions $P_{1+}''$ in the track $T_i$, $P_{3+}''$ as positioned in the track $T_d$ and/or $P_{4+}''$ as positioned in the track $T_b$, the information in the portions $P_{3+}''$ and/or $P_{4+}''$ now comes too early, so that the information read out from those portions should be delayed over one rotation of the head drum before processing.

Figure 12C:
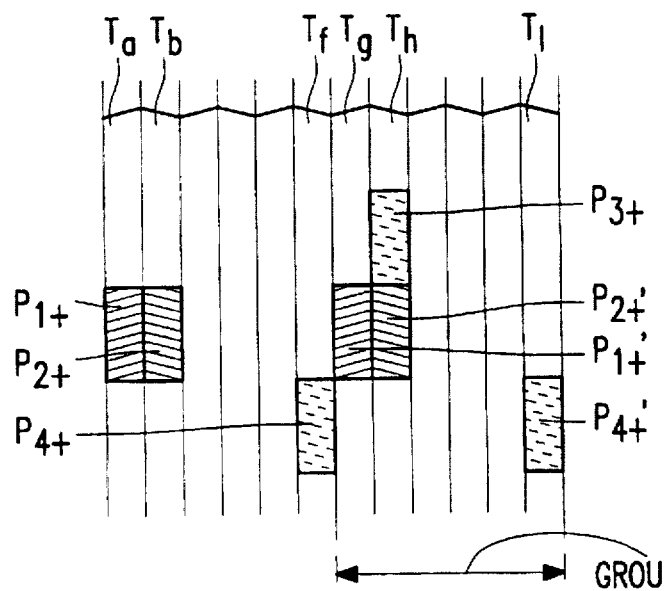

FIG. 12C shows the format of FIG. 12A, in the form of the portions $P_{1+}$ to $P_{4+}$ in the tracks $T_a$, $T_b$, $T_h$ and $T_f$, respectively. FIG. 12C shows, however, the format of FIG. 12A repeated two times inside the group of 12 tracks. As a result, track portions $P_{1+}'$, $P_{2+}'$ and $P_{4+}'$ are present in the tracks $T_g$, $T_h$ and $T_f$, respectively. The portion $P_{3+}'$ is present in the next group of 12 tracks, and thus not shown. The information contents of the portions $P_{1+}'$ and $P_1$ are equal and the information contents of the portions $P_{2+}'$ and $P_2$ are equal. Now groups of 6 tracks can be identified in FIG. 12C, namely, a group of tracks $T_g$ to $T_l$. Subsequent groups of 6 tracks have the same format but do not comprise the same information. But, again, the portion $P_{3+}'$ may be shifted from its position in a track in the next group of 12 tracks, to the same position in the track $T_b$ in the first group of 6 tracks $T_a$ to $T_f$, which position is the same position as the position of the portion $P_{3+}$ in the track $T_h$. In this way, two identical groups of 6 tracks has been obtained, where, when using the portions $P_{1+}'$ and the portion $P_{3+}''$ in the trick mode, the information from the portion $P_{3+}'$ comes too early.

It should be noted that having the format of FIG. 12B or FIG. 12C results in a quicker locking-in during read out in the trick mode, as searching for a group of 12 tracks lasts longer than searching for a group of 4 or a group of 6 tracks. See also the discussion given below.

Figure 13:
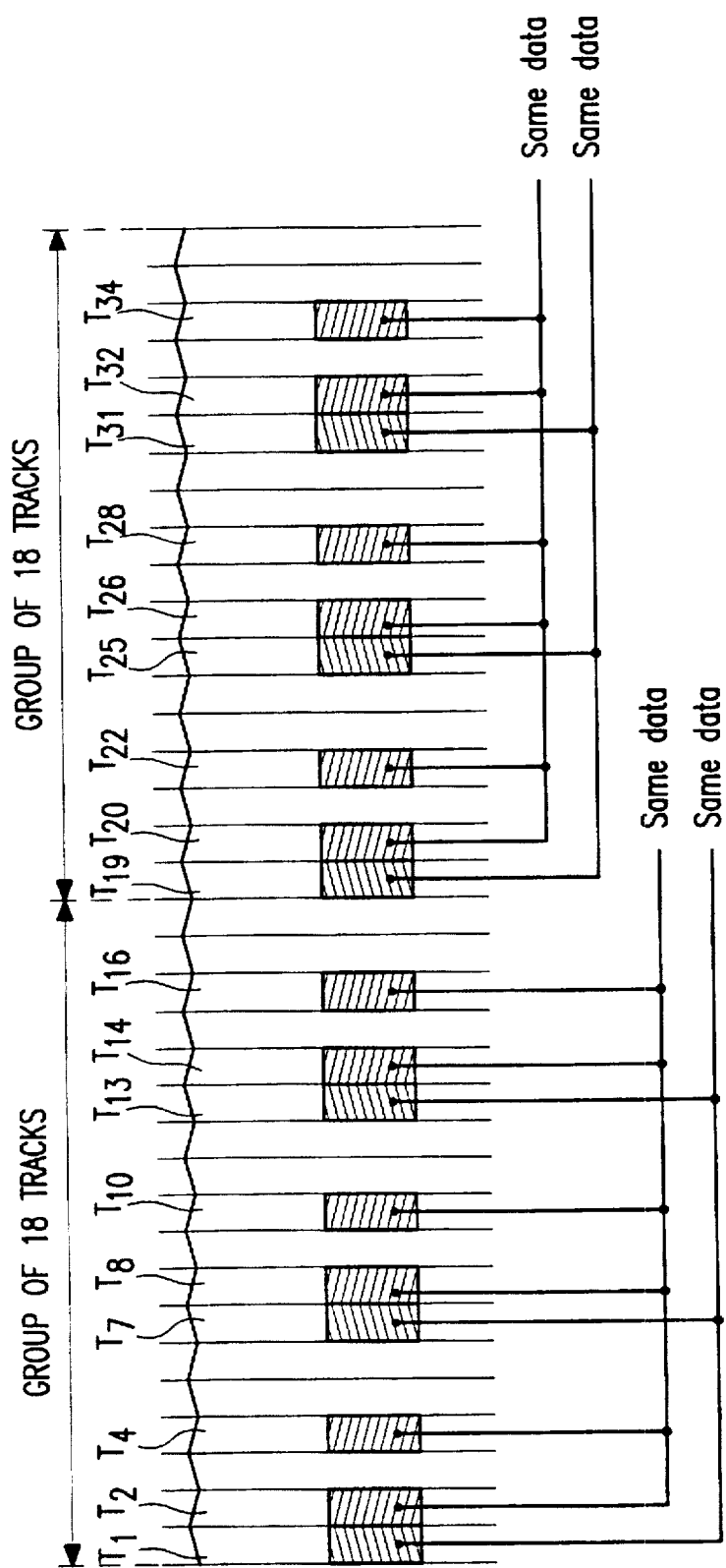
FIG. 13 shows a track configuration for realizing a $9.v_n$ trick mode.

FIG. 13 shows the track format for a 9 times $v_n$ trick mode in the forward direction. One could argue that the trick mode information could be stored in the track portions of the tracks $T_1$, $T_2$, $T_{10}$, $T_{19}$ and $T_{20}$. However, in this case, a large lock-in time is needed in order to lock the heads on exactly those tracks that contain the portions of trick mode information.

Therefore, a group of 18 tracks is visible, where the information in the track portions having hatched lines from bottom left to top right is the same, and where the information in the track portions having hatched lines from top left to bottom right also have the same information content. The information contents in the portions in the tracks $T_1$, $T_2$ and $T_4$ in the group of 18 tracks is thus repeated two times. That is: the information contents in the portion in the track $T_1$ is repeated in the portions in the tracks $T_7$ and $T_{13}$, and the information contents in the portions in the tracks $T_2$ and $T_4$ (which are the same) is repeated in the portions in the tracks $T_8$, $T_{10}$, $T_{14}$ and $T_{16}$.

During reproduction in the 9 times $v_n$ trick mode, the record carrier speed can now be controlled in such a way that the heads lock on one of the three pairs of track portions (to be explained here below) in each group, so that the trick mode information recorded in each group can be read by the heads. Because of the fact that three positions within each group are present to lock the heads on, a smaller lock-in time is required.

Assuming that the scanner configuration is in accordance with FIGS. 1A or 1C, a head pair $A_i/B_i$ can scan either the portions in the tracks pairs $T_1/T_2$; $T_{19}/T_{20}$; etc., or the track pairs $T_7/T_8$; $T_{25}/T_{26}$; etc, or the track pairs $T_{13}/T_{14}$; $T_{31}/T_{32}$; etc. in the subsequent groups of 18 tracks. Assuming that the scanner configuration is in accordance with FIG. 1B, the heads A/B can scan either the portions in the tracks pairs $T_1/T_{10}$; $T_{19}/T_{28}$; etc., or the track pairs $T_7/T_{16}$; $T_{25}/T_{34}$; etc., or the track pairs $T_{13}/T_{22}$; $T_{31}/T_{40}$ (not shown); etc. in the subsequent groups of 18 tracks.

As can be seen in FIG. 13, trick mode information for the −9 times $v_n$ trick mode can be inserted in the intermediate tracks, in an equivalent manner as explained above.

Figure 14:
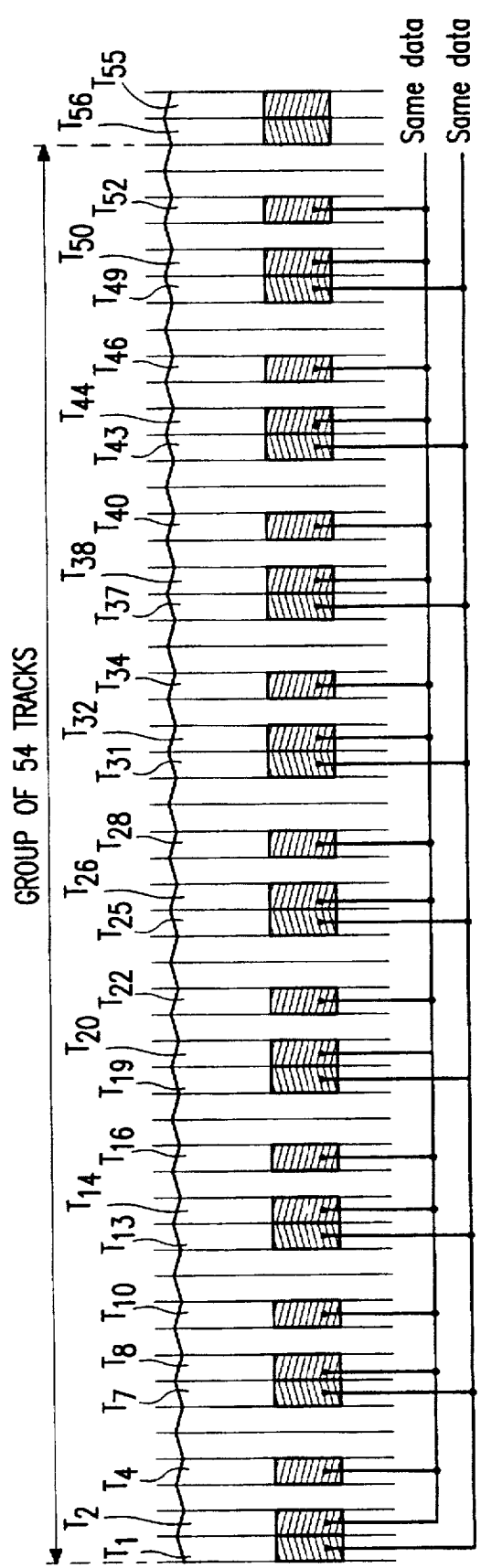
FIG. 14 shows a track configuration for realizing a $27.v_n$ trick mode.

FIG. 14 shows the track format for a 27 times $v_n$ trick mode in the forward direction. One could argue that the trick mode information could be stored in the track portions of the tracks $T_1$, $T_2$, $T_{28}$, $T_{55}$ and $T_{56}$. However, in this case, an even larger lock-in time is needed in order to lock the heads on exactly those tracks that contain the portions of trick mode information.

Therefore, a group of 54 tracks is visible where the information in the track portions having hatched lines from bottom left to top right is the same, and where the information in the track portions having hatched lines from top left to bottom right also have the same information content. The information contents in the portions in the tracks $T_1$, $T_2$ and $T_4$ in the group of 54 tracks is thus repeated 8 times. That is: the information contents in the portion in the track $T_1$ is repeated in the portions in the tracks $T_7$, $T_{13}$, $T_{19}$, $T_{25}$, $T_{31}$, $T_{37}$, $T_{43}$ and $T_{49}$, and the information contents in the portions in the tracks $T_2$ and $T_4$ (which are the same) is repeated in the portions in the tracks $T_8$, $T_{10}$, $T_{14}$, $T_{16}$, $T_{20}$, $T_{22}$, $T_{26}$, $T_{28}$, $T_{32}$, $T_{34}$, $T_{38}$, $T_{40}$, $T_{44}$, $T_{46}$, $T_{50}$ and $T_{52}$.

During reproduction in the 27 times $v_n$ trick mode, the record carrier speed can now be controlled in such a way that the heads lock on one of the nine pairs of track portions (to be explained here below) in each group, so that the trick mode information recorded in each group can be read by the heads. Because of the fact that nine positions within each group are present to lock the heads on, a smaller lock-in time is required.

Assuming that the scanner configuration is in accordance with FIGS. 1A or 1C, a head pair $A_i/B_i$ can scan either the portions in the tracks pairs $T_1/T_2$; $T_{55}/T_{56}$; etc., or the track pairs $T_7/T_8$; $T_{61}/T_{62}$ (both not shown); etc., or the track pairs $T_{13}/T_{14}$; $T_{67}/T_{68}$ (both not shown); etc. or the track pairs $T_{19}$,$T_{20}$; $T_{73}$,$T_{74}$ (both not shown), etc., and so on, in the subsequent groups of 54 tracks. Assuming that the scanner configuration is in accordance with FIG. 1B, the heads A/B can scan either the portions in the tracks pairs $T_1/T_{28}$; $T_{55}/T_{82}$ (not shown); etc., or the track pairs $T_7/T_{34}$; $T_{61}/T_{88}$ (both not shown); etc., or the track pairs $T_{13}/T_{40}$; $T_{67}/T_{94}$ (both not shown); etc., and so on, in the subsequent groups of 54 tracks.

As can be seen in FIG. 14, trick mode information for the –27 times $v_n$ trick mode can be inserted in the intermediate tracks, in an equivalent manner as explained above.

Figure 15:
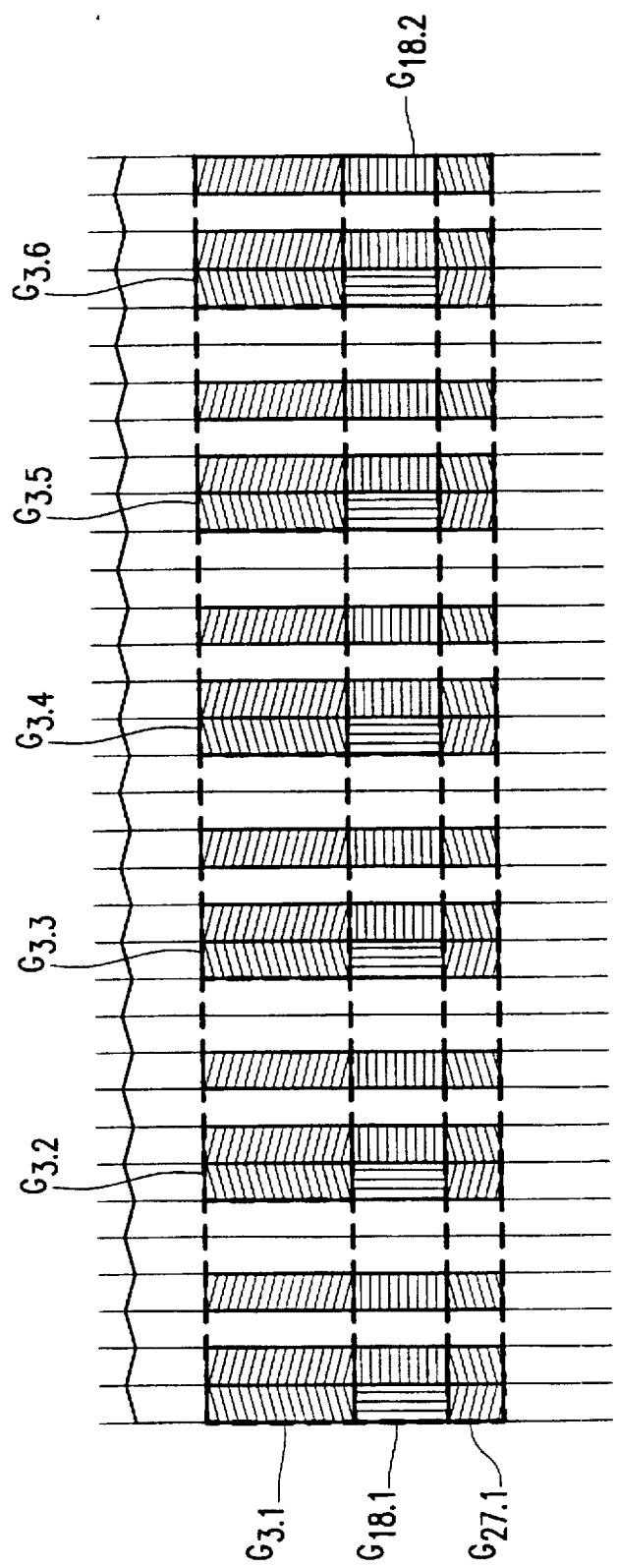
FIG. 15 shows a track configuration for realizing a $3.v_n$, a $9.v_n$ and a $27.v_n$ trick mode.

FIG. 15 shows a combined track format for enabling a 3×, 9× and 27× trick mode in the forward direction. The trick mode information for the 3× $v_n$ trick mode is included in the groups of 6 tracks, in the way as explained with reference to FIG. 5. The groups of 6 tracks are denoted by $G_{3.1}$ to $G_{3.6}$ in FIG. 15. The trick mode information for the 9× $v_n$ trick mode is included in the groups of 18 tracks, in the way as explained with reference to FIG. 13. The groups of 18 tracks are denoted by $G_{18.1}$ and $G_{18.2}$ in FIG. 15. The trick mode information for the 27× $v_n$ trick mode is included in the groups of 54 tracks, in the way as explained with reference to FIG. 14. Only one such group of 54 tracks is shown in FIG. 15, but not complete, and is denoted by $G_{27.1}$.

As can be seen in FIG. 15, the length of the portions for the various trick mode velocities decrease for increasing trick mode velocity. This for the reason that for higher trick mode velocities, the angle between the track and the path along which a head traverses the record carrier increases, so that a shorter portion of each track can be read.

As a general conclusion for a trick mode having a velocity of the record carrier of n times $v_n$, a group of 2p tracks can be identified in which the trick mode is stored in portions of tracks in a group. p is a divisor of the number n. As an example, assume that n is 30. Divisors of 30 are the numbers 2, 3, 5, 6, 10, 15 and 30. Thus one can identify groups of 4 tracks, or groups of 6 tracks, or groups of 10 tracks, or groups of 12 tracks, or groups of 20 tracks, or groups of 30 tracks or groups of 60 tracks. In most situations, it can be said that the information contained in one group is repeated in the n/p groups. In accordance with the example of FIG. 14, n=27, p=3, so that 9 groups of 6 tracks are present having the same information content in the track portions.

Further, it should be noted that, in order to compensate for inaccuracies in the servo system, which should locate the path of the heads exactly on the portions in the groups, it may be required to repeat the trick mode information, that must be stored in a track portions in a track, a number of times, so that also, in the case of a less accurate positioning, the heads will always read the trick mode information from the track portions.

Figure 16:
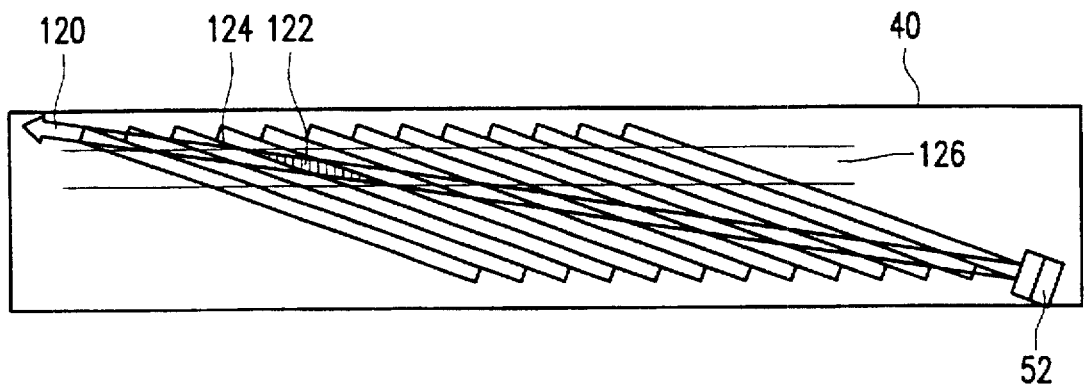
FIG. 16 shows the location of the trick mode information in the tracks on a record carrier.

FIG. 16 shows the record carrier 40 having a number of slant tracks recorded on it. FIG. 16 also shows a path, denoted by the reference numeral 120, via which one of the reading heads, denoted 52, scans the record carrier in a trick mode. When scanning the record carrier along the path 120, the head 52, which has one of the two azimuth angles, will be able to read information from only the even-numbered, or only the odd-numbered tracks.

In order to enable a reproduction of video information during a trick play mode, especially in the case of video information being recorded in a data reduced form, it is required to add special trick play information in special locations in the tracks such that those locations are scanned by the head 52 for the various transport speeds for the record carrier that are possible in a trick play mode. This trick play information is special video information recorded in addition to the normal play video information that has been recorded in the tracks. As a consequence, some portion of a track, such as the portion 122 in the track 124, comprises this trick play information, which should be scanned and read by the head 52 in the trick play mode. More specifically, a band, denoted 126, which runs in the longitudinal direction of the record carrier 40, is formed having the trick mode information, in the form of the groups described above, included in the tracks.

It should be noted here that the video data recorded in the tracks for the normal playback mode comprises data reduced video information. In the case that the video data is MPEG video data, it should be noted that, to realize such data reduced video information, the information corresponding to one picture is intra-encoded so as to obtain so called I-frames. A higher data reduction can be obtained by carrying out an inter-frame encoding on two pictures, resulting in an I-frame for the first picture and a P-frame for the second picture. For recreating the two pictures, an intra-frame decoding, inverse to the intra-frame encoding, must be carried out on the I-frame information, so as to regenerate the first picture, and an inter-frame decoding, inverse to the inter-frame encoding, must be carried out using both the I-frame information and the P-frame information, so as to regenerate the second picture. Thus, the normal play video data recorded in the tracks comprise information relating to sequences of I and P frames. Further, B frames are present in the sequence, which B frames, in the same way as the P frames, cannot be decoded on its own but need information from other pictures. For a further description of the MPEG information signal standard, reference is made to Reference (4) in the LIST OF REFERENCES.

Figure 17:
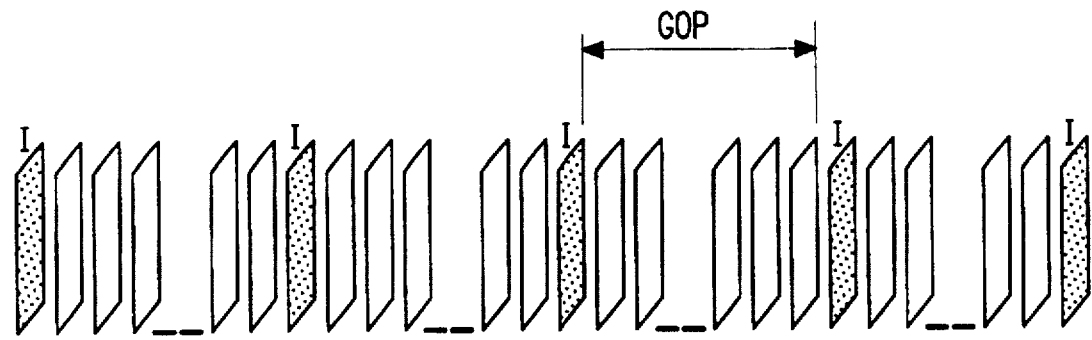
FIG. 17 shows a sequence of I, B and P frames in an MPEG video datastream.

FIG. 17 shows a sequence of pictures, as encoded so as to obtain an MPEG video signal. The pictures indicated by an 'I' are the intra-frame encoded pictures. An intra-frame encoded I picture and the inter-frame encoded P and B pictures that follow the intra frame encoded I picture, are called a group of pictures (GOP), a well known defined item in MPEG encoding of video signals. During 'normal play' processing, all of the pictures shown in FIG. 17 are processed for recording on the record carrier as 'normal play' data.

In a trick mode, as an example, only I-frame information, if needed in a further data-reduced form, are used as the trick mode information for recording in the portions in the tracks.

Figure 18:
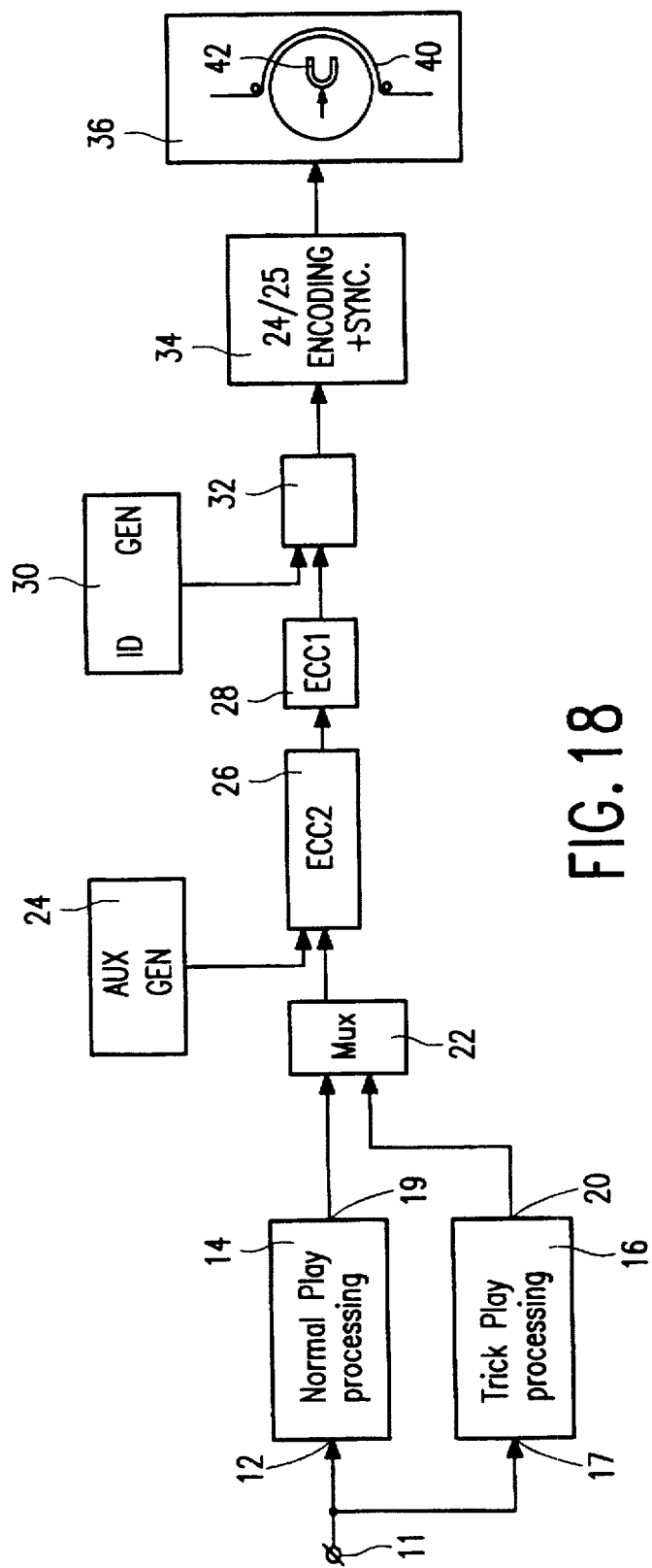
FIG. 18 shows an embodiment of a recording arrangement.

FIG. 18 shows, schematically, an embodiment of the recording arrangement. The recording arrangement comprises an input terminal 11 for receiving the MPEG serial datastream for recording in the tracks. The input terminal 11 is coupled to an input 12 of a 'normal play' processing unit 14. Further, a 'trick play' processing unit 16 is provided having an input 17 also coupled to the input terminal 11. Outputs 19 and 20 of the 'normal play' processing unit 14 and the 'trick play' processing unit 16 are coupled to corresponding inputs of a multiplexer 22.

An auxiliary signal generator 24 is present for supplying the auxiliary signal information for storage in the tracks. Outputs of the multiplexer 22 and the generator 24 are coupled to corresponding inputs of an error correction encoder unit 26. The error correction encoder unit 26 is capable of carrying out an error correction encoding step, denoted ECC2. Next, an error correction encoding step, denoted ECC1, is carried out in an error correction encoder unit 28.

The recording arrangement further comprises a generator 30 for adding the ID information, for adding subcode information. After combination of the signals in the combining unit 32, the combined signal is applied to a unit 34, in which an encoding is carried out where, each time, 24-bit words of the incoming bitstream are converted into 25-bit words, where sync information is added.

The 24-to-25 encoding carried out in the encoding unit 34 is well known in the art. Reference is made in this respect to U.S. Pat. No. 5,142,421, Reference (5) in the LIST OF REFERENCES. This Reference also shows a way of adding the sync information to the datastream.

An output of the encoding unit 34 is coupled to an input of a writing unit 36, in which the datastream obtained with the encoding unit 34 is recorded in the slant tracks on the record carrier, by means of at least two write heads. The writing unit 36 has one of the scanner configurations shown in FIG. 1.

The error correction encoding steps, denoted ECC1 and ECC2, are needed so as to enable an error detection and correction in the reproducing arrangement to be discussed later.

No further description of the 'normal play' processing unit 14 will be given, as such description is not relevant for the explanation of the present invention. It should, however, be noted that earlier filed U.S. patent application Ser. No. 08/225,193, filed Apr. 8, 1994 (PHN 14.818), Reference (6) in the LIST OF REFERENCES, and filed in the name of the same Assignee, gives an extensive description of the recording arrangement, as far as the 'normal play' processing during recording of an MPEG information signal is concerned. This application is therefore incorporated herein by reference.

Before a further description of the 'trick play' processing unit 16 of the recording arrangement of FIG. 18 will be given, first a schematic description of the reproducing arrangement will be given.

Figure 19:
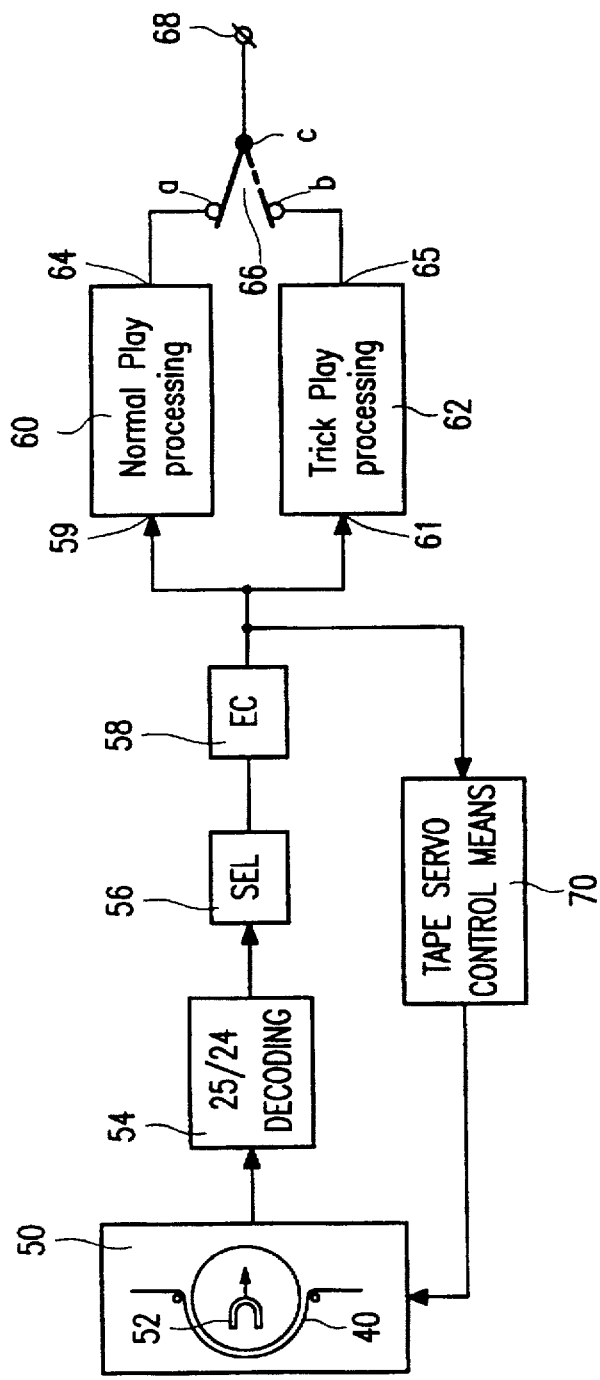
FIG. 19 shows an embodiment of a reproducing arrangement.

FIG. 19 shows, schematically, an embodiment of a reproduction arrangement for reproducing information from the record carrier 40 obtained with the recording arrangement of FIG. 19. The reproduction arrangement comprises a reading unit 50, having at least two reading heads in accordance with one of the scanner configurations of FIGS. 1A–1C, for reading information from the slant tracks on the record carrier 40. An output of the reading unit 50 is coupled to an input of a decoding unit 54, which carries out a 25-to-24 decoding on the signal read out, so as to convert 25-bit words in the incoming datastream into 24-bit words. Next, after having selected out, in the selector unit 56, all those information that are not required for recreating a replica of the original MPEG datastream, an error correction is carried out in the error correction unit 58. It will be clear that the error correction carried out has two steps. One error correction step based on the ECC1, and one step based on the ECC2.

The output terminal of the error correction unit 58 is coupled to an input of a 'normal play' processing unit 60. Further, a 'trick play' processing unit 62 is provided having an input also coupled to the output of the error correction unit 58. Outputs 64 and 65 of the 'normal play' processing unit 60 and the 'trick play' processing unit 62 are coupled to corresponding terminals a and b, respectively, of a switch 66, a c-terminal of which is coupled to an output terminal 68. If the reproducing arrangement is switched into a 'normal play' reproduction mode, this means that the record carrier is transported at a nominal speed, that the 'normal play' processing unit 60 is enabled and the switch 66 is switched into the position a-c. If the reproducing arrangement is switched into a 'trick play' reproduction mode, also called 'feature mode', this means that the record carrier is transported at a speed other than the nominal speed, that the 'trick play' processing unit 62 is enabled and the switch 66 is switched into the position b-c.

For enabling a 'trick play' reproduction mode, the reproducing arrangement is further provided with a tape servo control means 70 which generates a control signal for controlling the speed of the record carrier 40. More specifically, the control means 70 generates a control signal during the 'trick play' reproduction mode for transporting the record carrier 40 such that, in the example of FIG. 12A and with a scanner configuration as per FIG. 1A or FIG. 1C, a head pair A/B exactly crosses the hatched portions in the track pairs $T_a/T_b$; $T_m/T_n$,.... etc., or such that, in the example of FIG. 12A and with a scanner configuration as per FIG. 1B, the pair of heads A/B exactly crosses the hatched portions in the track pairs $T_a/T_b$, $T_j/T_h$; ... etc. In the example of FIG. 12B, the control means 70 generates a control signal such that the portions in the tracks belonging to either the group of 4 tracks $T_a$ to $T_d$, or the group of 4 tracks $T_e$ to $T_h$, or the group of 4 tracks $T_i$ to $T_l$, are scanned. In the example of FIG. 12C, the control means 70 generates a control signal such that the portions in the tracks belonging to either the group of 6 tracks $T_a$ to $T_f$, or the group of 6 tracks $T_g$ to $T_l$, are scanned. A further explanation of the functioning of the servo control means 70 will be given below with reference to FIG. 21.

It should also be noted that the previously mentioned Reference (6) of the LIST OF REFERENCES gives an extensive description of the reproducing arrangement, as far as the 'normal play' processing during reproducing of an MPEG information signal is concerned.

In Reference (6) in the LIST OF REFERENCES, an explanation has been given how the 'normal play' data, supplied by the normal play' processing unit 14, has been stored in a track on the record carrier, such as a record carrier of the DVC type, by means of a recording arrangement, such as of the DVC type.

Figure 20:
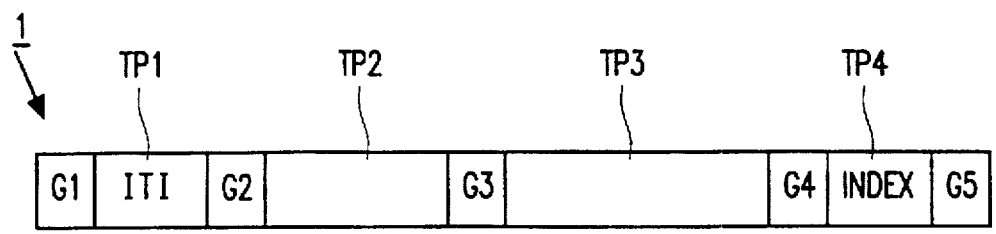
FIG. 20 shows the format of a track on the record carrier.

More specifically, FIG. 20 shows the format of a track 1 on the record carrier. The left end of the track 1 in FIG. 20 is the start of the track, and the right end of the track is the terminal part of the track. The track comprises a number of track parts. The track part denoted by G1 is the pre-amble track part. An example of the preamble track part G1 has been described extensively in Reference (1).

The track part G1 is followed by tracking tone recording part TP1, which is denoted by ITI (insert timing information) track part and which contains a tracking tone, synchronization information, and identification (or timing) information. Further explanation of the contents of the ITI track can be found in Reference (3).

The track part TP1 is followed by an edit gap G2. The edit gap G2 is followed by the track part TP2, which is in accordance with the DVC format the audio signal recording sector and comprises digital audio information. In Reference (6), it is shown that this track part contains parity information. The edit gap G3 is followed by a track part TP3 which is, in accordance with the DVC format, the video signal recording sector and comprises digital video information. In Reference (6), it is shown that the information generated by the 'normal play' processing unit 14 and the 'trick play' processing unit 16 is stored in this track part. The edit gap G4 is followed by a track part TP4, denoted by INDEX and which comprises, among others, subcode information, such as absolute and/or relative time information and a Table of Contents (TOC). The track is terminated by the track part G5. It can be said that the sequence order in which the parts TP1, TP2 and TP3 occur in the tracks may be different.

Figure 21:
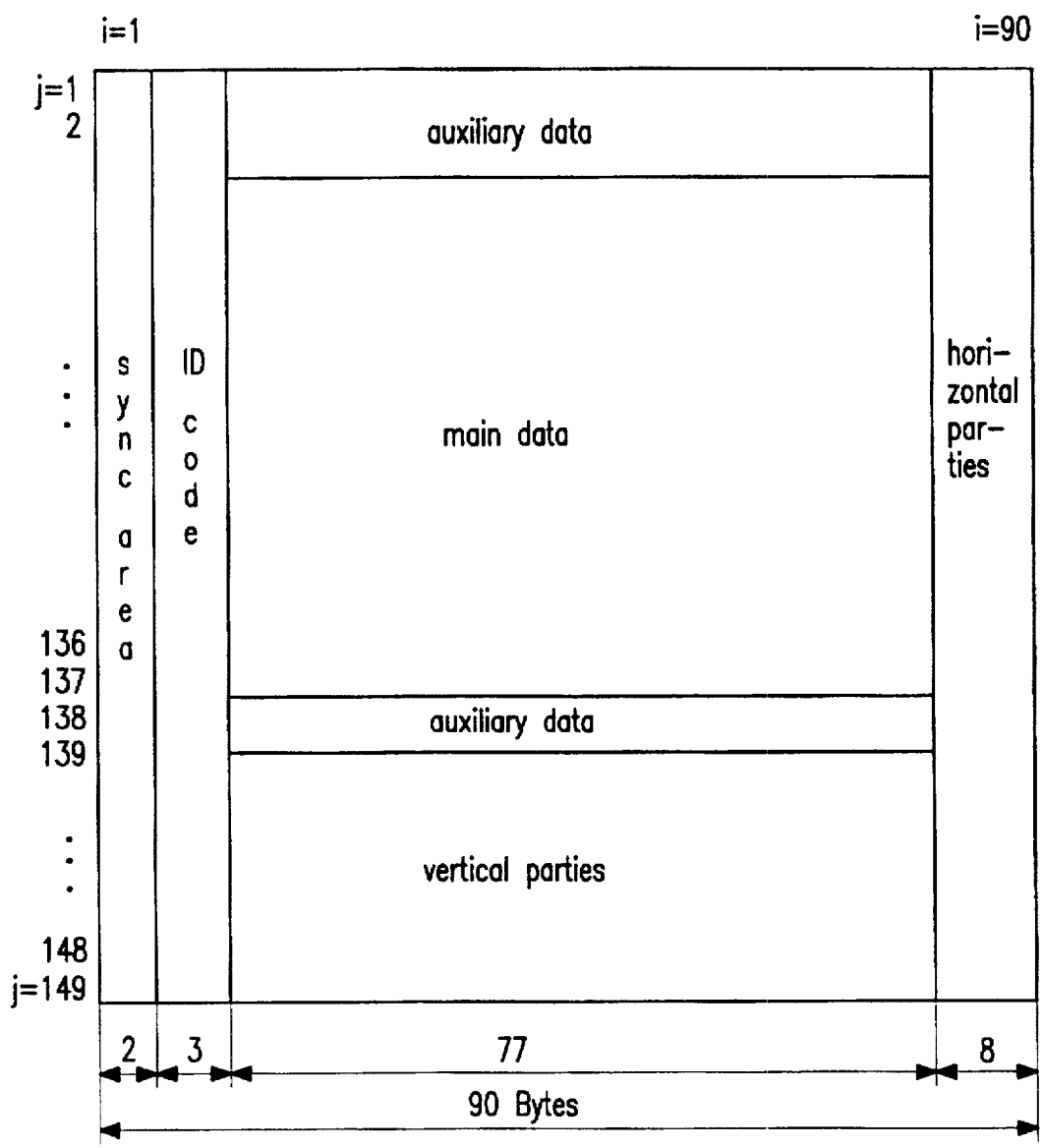
FIG. 21 shows the contents of one of the track parts in the track of FIG. 20.

The contents of the sector TP3 is given in FIG. 21. FIG. 21, in fact, shows, schematically, a number of 149 horizontal lines, denoted by j=1 to j=149, having bytes of information stored in it. The 149 lines are, in fact, 149 signal blocks (or sync blocks) that are stored sequentially in the recording sector TP3. 90 bytes of information, denoted by i=1 to i=90, are stored in each signal block.

The first two bytes (i=1 and i=2) of each signal block form a synchronization pattern of 2 bytes long. The following three bytes in each signal block form an ID code, comprising, among others, information which indicates the sequence number of the signal block in the recording part TP3. The last eight bytes in the signal blocks form horizontal parity information. Vertical parity information is stored in the storage locations i=6 to i=82 inclusive of the last 11 signal blocks.

In accordance with the present invention, bytes of 'normal play' information generated by the 'normal play' processing unit 14 and bytes of 'trick play' information, generated by the 'trick play' information unit 16 and encoded in the encoder 34, are stored in the storage locations i=6 to i=82 inclusive of the signal blocks having the sequence numbers j=3 to j=137 inclusive. Bytes of auxiliary data are stored in the storage locations i=6 to i=82 inclusive of the signal blocks having the sequence numbers j=1, 2 and 138. The signal blocks are stored sequentially in the track part TP3, starting with the signal block denoted j=1, followed by the signal block denoted j=2, and so on until the signal block denoted j=149.

The auxiliary data for storage in the signal blocks denoted j=1, 2 and 138 can be teletext data or control data.

It should be noted here that it can be specified that the auxiliary data will be stored in a different location in the memory. Reference is made in this respect to Reference (1), FIG. 13, where the auxiliary data is stored in the memory part denoted by III.

More specifically, a sync block contains either 'normal play≦ information or 'trick play' information. Reference (6) extensively describes the storage of the 'normal play' information in the signal (or sync) blocks.

The invention now aims at storing the trick play' information in the signal blocks.

Only 77 bytes, denoted by i=6 to 82, in the signal blocks denoted by j=3 to 137, are available for the storage of the 'trick play' information generated by the 'trick play' processing unit 16. From Reference (6), it can be understood that the first two bytes in each signal block are reserved for the insertion of all kind of additional data, such as a signal block numbering and/or an identification identifying the signal block as containing either 'normal play' information or 'trick play' information. Hence, 75 bytes remain available in each signal block. The trick play' information could thus be stored in a number of those signal blocks that are located in the track portions identified above with reference to FIGS. 2A–2E to 15.

It should be noted that, during reproduction in a trick mode, no full blocks of data, as shown in FIG. 21, can be read out of a track during a scan by a read head across said track. Only a number of directly succeeding signal blocks can be read out in such a situation. As a consequence, no error correction using the vertical parity information can be carried out during a trick mode. Only the 8 horizontal parity bytes in each signal block can be used to carry out an error correction, which error correction is however less powerful than if an error correction on the horizontal and vertical parity bytes would have been carried out.

In order to further protect the 'trick play' information against errors that can occur during the recording and a subsequent reproduction step, an additional error correction encoding step is carried out on the 'trick play' information so as to obtain an error protection encoded 'trick play' information signal. This additional error correction encoding step will be explained hereunder with reference to FIGS. 22, 23 and 24.

First of all, a further explanation of the servo control means 70 of FIG. 19 will be given. As has been said above, during read out in a trick mode, only a number of signal blocks stored in the track portion TP3 can be read, so that only an error correction in a signal block based on the horizontal parity bytes in said block can be carried out. This results in an indication whether the trick mode information contained in the signal block is correct. If so, the ID information contained in the bytes i=3,4 and 5 of the signal block, see FIG. 21, is detected by the servo control means 70. In the ID information is included a track number information and a signal block number information. The servo means 70 can thus identify in which track and in which location in a track the signal block just read out lies. The servo control means further has information in what tracks and in what signal blocks in a track the trick mode information is stored. As a result, when the track number and the signal block number do not coincide with the required track number and signal block number, the transport speed is controlled such that the correct tracks and the correct signal block are read out.

Figure 22:
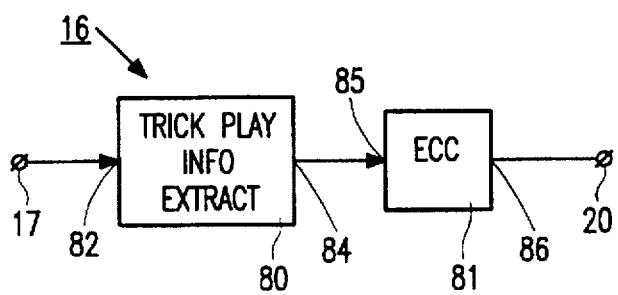
FIG. 22 shows an embodiment of the 'trick play' processing unit in the recording arrangement of FIG. 18.

FIG. 22 shows, schematically, an embodiment of the 'trick play' processing unit 16 of the recording arrangement of FIG. 18, which has its input 17 coupled to an input 82 of a 'trick play' information extraction unit 80, an output 84 of which is coupled to an input 85 of an error correction encoding unit 81. An output 86 of the error correction encoding unit 81 is coupled to the output 20 of the unit 16. The unit 80 is adapted to extract the 'trick play' information from the information signal, that is, e.g., the MPEG information signal, that is supplied to the input 17. This means that, as explained earlier, the I frames are extracted from the MPEG information stream. The error correction encoding unit 81 carries out an error correction encoding on the 'trick play' information. The error correction encoded 'trick play' information signal is supplied to the output 20 and will be stored in the 75 bytes of a number of signal blocks.

Figure 23:
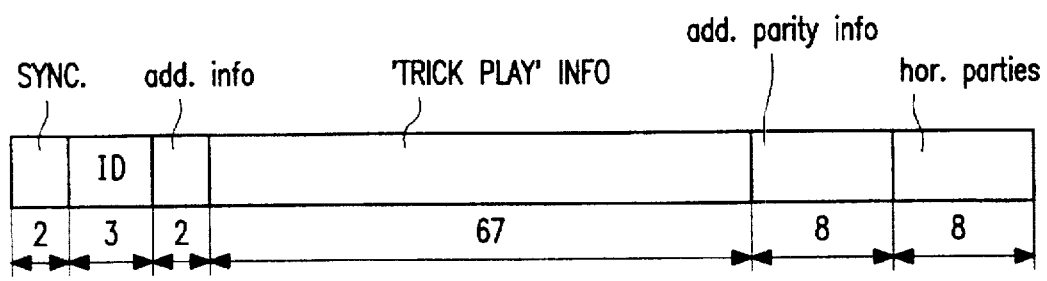
FIG. 23 shows the contents of a signal block comprising error correction encoded 'trick play' information.

Two possible error correction encodings that can be carried out in the error correction encoding unit 81 will be discussed. In the first error correction encoding, an error correction encoding is carried out on, e.g., 67 bytes of trick play' information that will be stored in a signal block so as to obtain (in this case) 8 additional parity bytes, see FIG. 23. FIG. 23 shows the contents of one signal block, that is, the contents of one horizontal line in the FIG. 21. The 77 bytes available in each signal block are now filled by the 2 bytes, discussed earlier, that contain additional identification information, next 67 bytes of 'trick play' information, and the 8 additional parity bytes.

Figure 24:
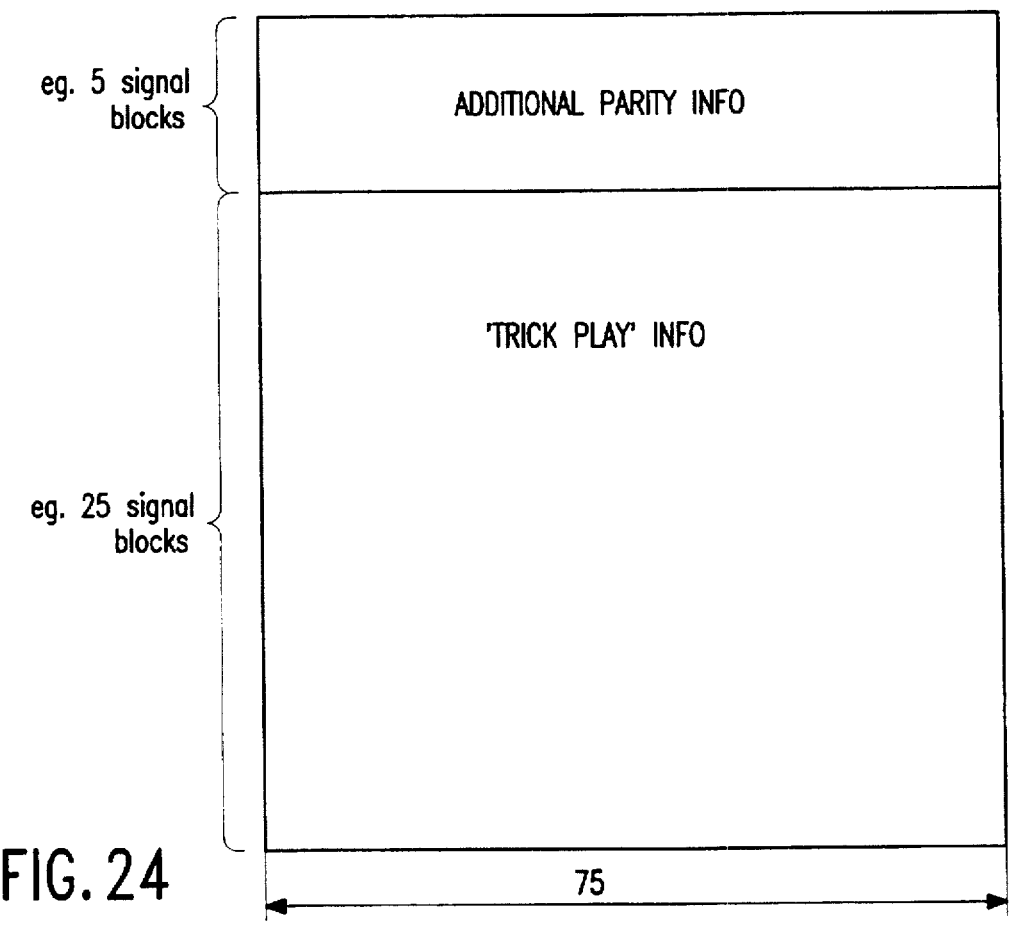
FIG. 24 another error correction encoding on the 'trick play' information.

Another way of error correction encoding is explained with reference to FIG. 24. FIG. 24 shows a sequence of (in this example) 25 signal blocks having 75 bytes of 'trick play' information stored in each of them. In the vertical direction in FIG. 24, an error correction encoding step is carried out resulting in (in this example) 5 signal blocks of additional parity information. This sequence of 30 signal blocks is now stored in the track portions discussed above. It should be noted that the sequence of 30 signal blocks can be stored in different track portions, as long as, during a 'trick play' mode, all the information can be reproduced.

Figure 25:
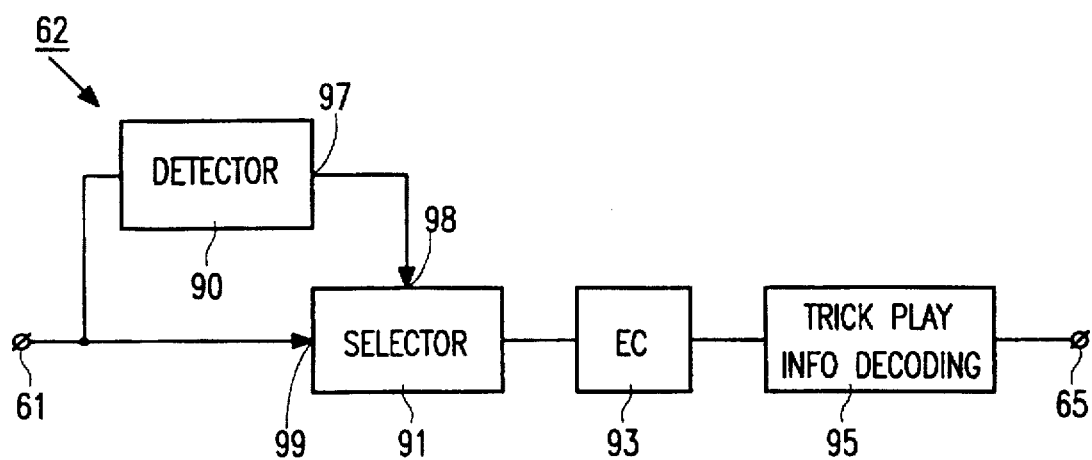
FIG. 25 an embodiment of the 'trick play' processing unit in the reproducing arrangement of FIG. 19.

FIG. 25 shows an embodiment of the 'trick play' processing unit 62 of the reproducing arrangement of FIG. 19. Its input 61 is coupled to inputs of a detector unit 90 and a selector unit 91. The detector unit 90 is adapted to detect identification information included in the two bytes in the signal blocks, identified in FIG. 23 as 'add. info', which identification information identifies signal blocks as comprising either 'normal play' data or 'trick play' data. This identification signal is extensively discussed in Reference (6). In response to the detection of a signal block as comprising 'trick play' information, the detector 90 generates a detection signal at its output 97, which detection signal is supplied to a control signal input 98 of the selection unit 91. In response to the reception of this detection signal, the selection unit 91 selects the signal blocks comprising the 'trick play' information from the datastream applied to its input 99, and supplies the selected signal blocks to an output which is coupled to an input of an error correction unit 93, which carried out an error detection and correction step on the data applied to its input, under the influence of the additional parity information shown in FIG. 23 or FIG. 24. The error corrected 'trick play' data is supplied to a 'trick play' decoding unit 95 in which picture information is retrieved from the information received for display in the trick play mode.

LIST OF REFERENCES (1) European Patent Application No. 492,704, corresponding to U.S. Pat. No. 5,245,483 (PHN 13.546)
(2) European Patent Application No. 93.202.950, corresponding to U.S. patent application Ser. No. 08/127, now U.S. Pat. No. 5,424,878 (PHN 14.241)
(3) European Patent Application No. 93.201.263, corresponding to U.S. Pat. No. 5,400,187 (PHN 14.449)
(4) Grand Alliance HDTV System Specification, Draft document, Feb. 22, 1994.
(5) U.S. Pat. No. 5,142,421 (PHN 13.537)
(6) U.S. patent application Ser. No. 08/225,193, filed Apr. 8, 1994 (PHN 14.818)
(7) U.S. Pat. No. 5,109,271 (PHN 12.975)
(8) European Patent Application No. 509,594, corresponding to U.S. patent application Ser. No. 08/204,904, filed Mar. 2, 1994 (PHN 13.668)
(9) Belgian Patent Application No. 93.00.746, corresponding to U.S. patent application Ser. No. 08/276,004, filed Jul. 15, 1994 (PHN 14.515)

We claim:

1. Recording arrangement for recording a digital video signal in slant tracks on a magnetic record carrier, the recording arrangement comprising an input terminal for receiving the digital video signal, channel encoding means for channel encoding the digital video signal so as to obtain a channel signal suitable for recording in a track on said record carrier, writing means for writing the channel signal in the tracks, the writing means comprising at least a first and a second writing head having head gaps of different azimuth angles and located at the circumference of a rotatable head drum, wherein the recording arrangement is further provided with trick mode information generation means for deriving a trick mode video signal from the digital video signal, the channel encoding means being adapted to encode the trick mode video signal and the digital video signal so as to obtain a composite channel signal at its output, the writing means being adapted to write the composite channel signal in the tracks, that, for realizing a trick mode reproduction in a reproducing arrangement having reading means for reading the composite channel signal from the tracks, the reading means having at least a first and a second reading head located on a head drum such that the two heads are either located separately from each other at an angle around the circumference of the head drum or form a head pair of two rigidly connected heads located side by side, the first and second heads of the reading means having gaps with an azimuth angle which is substantially equal to the azimuth angle of the first and second write head respectively of the writing means, the transport speed of the record carrier in the said trick mode being n times the nominal transport velocity during normal play reproduction where n is an integer and comprises a divisor number p larger than 1, the channel encoding means are adapted to encode the trick mode video signal in such a way that in a group of 2p tracks the encoded trick mode video signal is recorded in a portion of a first, second and a third track in said group of 2p tracks, the first and second tracks being neighbouring tracks, the encoded trick mode information stored in the portion of the first track being different from the encoded trick mode information stored in the portion of the second track, the encoded trick mode information stored in the portion of the third track being equal to at least part of the encoded trick mode information which is stored in the portion of one of the first and second tracks, and for p being an odd number, in the group of 2p tracks the neighbouring first and second tracks are spaced a number of p−2 tracks from the third track.

2. Recording arrangement as claimed in claim 1, wherein the information stored in the portion in the third track is recorded with a head having the same azimuth angle as the head with which the information is stored in the portion of said one of the first and second tracks.

3. Recording arrangement as claimed in claim 1, wherein for realizing a second trick mode reproduction in said reproducing arrangement at a transport speed of the record carrier in the said second trick mode being −n times the nominal transport velocity during normal play reproduction, the trick mode information generation means being further adapted to derive a second trick mode video signal from the digital video signal, the channel encoding means being adapted to encode the second trick mode video signal into an encoded second trick mode video signal in such a way that in said group of 2p tracks the said encoded second trick mode video signal is recorded in a portion of a fourth, fifth and a sixth track in said group of 2p tracks, the fourth and fifth tracks being neighbouring tracks, the encoded trick mode information stored in the portion of the fourth track being different from the encoded trick mode information stored in the portion of the fifth track, the encoded trick mode information stored in the portion of the sixth track being equal to at least part of the encoded trick mode information which is stored in the portion of one of the fourth and fifth tracks.

4. Recording arrangement as claimed in claim 3, wherein for p being an odd number, in the group of 2p tracks the neighbouring fourth and fifth tracks are spaced a number of p–2 tracks from the sixth track.

5. Recording arrangement as claimed in claim 3, wherein the first and the second tracks are different from the fourth and fifth tracks in the group of 2p tracks.

6. Recording arrangement as claimed in claim 5, wherein the portions in the first, second, fourth and fifth tracks are located at substantially the same position in the tracks.

7. Recording arrangement as claimed in claim 3, wherein the information stored in the portion in the sixth track is recorded with a head having the same azimuth angle as the head with which the information is stored in the portion of said one of the fourth and fifth tracks.

8. Recording arrangement as claimed in claim 3, characterized in that n is an odd number, and that the portions in the fourth, fifth and sixth tracks are located at substantially the same position in the tracks.

9. Recording arrangement as claimed in claim 3, wherein that n is an even number, that the portions in the fourth and fifth tracks are located at substantially the same position in the tracks and that the portion in the at least sixth track is located in a position in the track different from the position of the portions in the fourth and fifth tracks.

10. Recording arrangement as claimed in claim 1, wherein n is an odd number, that the portions in the first, second and third tracks are located at substantially the same position in the tracks.

11. Recording arrangement as claimed in claim 1, wherein n is an even number, that the portions in the first and second tracks are located at substantially the same position in the tracks and that the portion in the at least third track is located in a position in the track different from the position of the portions in the first and second tracks.

12. Recording arrangement as claimed in claim 1, wherein if n/p is an integer unequal to 1, the group of 2p tracks is repeated n/p times.

13. Recording arrangement as claimed in claim 1, characterized in that the trick mode information generation means is further provided with error correction encoding means for carrying out an error correction encoding step on the trick mode information.

14. Record carrier obtained with the recording arrangement as claimed in claim 1.

15. Reproducing arrangement for reproducing a digital video signal from slant tracks on the magnetic record carrier as claimed in claim 14, characterized in that the reproducing arrangement comprises reading means for reading a composite channel signal from tracks, the reading means comprising at least a first and a second reading head having head gaps of different azimuth angles and located at the circumference of a rotatable head drum, the composite channel signal comprising a channel signal and an encoded trick mode video signal, selection means for retrieving the channel signal and the encoded trick mode video signal from the composite channel signal, channel decoding means for channel decoding the channel signal so as to obtain a digital video signal, trick mode video signal decoding means for decoding the encoded trick mode video signal so as to obtain a second digital video signal, an output terminal for supplying the digital video signal or the second digital video signal, in that for realizing a trick mode reproduction with a record carrier speed being n times the nominal transport velocity of the record carrier, the read means are adapted to read the encoded trick mode information from the portion in the first track of the group of 2p tracks by means of the first head and to read encoded trick mode information from the portion in either the second track or the third track by means of the second head, where p is a divisor number of n larger than 1.

16. Reproduction arrangement as claimed in claim 15, wherein the trick mode video signal decoding means is further provided with error correction means for carrying out an error detection and error correction step on the trick mode information read from the tracks.

17. Reproduction arrangement as claimed in claim 15, characterized in that it comprises servo control means for controlling the record carrier speed so that the first head scans the portion in the first track and the second head scans either the portion in the second track or the portion in the third track in each group.

* * * * *